United States Patent
Levine et al.

(10) Patent No.: US 6,721,762 B1
(45) Date of Patent: Apr. 13, 2004

(54) METHOD AND SYSTEM FOR PACKING A PLURALITY OF ARTICLES IN A CONTAINER

(75) Inventors: Michael C. Levine, 2073 Birch Bluff, Okemos, MI (US) 48864; Jerry D. Norris, Grand Ledge, MI (US)

(73) Assignee: Michael C. Levine, Okemos, MI (US)

( * ) Notice: Subject to any disclaimer, the term of this patent is extended or adjusted under 35 U.S.C. 154(b) by 364 days.

(21) Appl. No.: 09/844,760

(22) Filed: Apr. 27, 2001

Related U.S. Application Data
(60) Provisional application No. 60/200,240, filed on Apr. 28, 2000.

(51) Int. Cl.⁷ .............................. G06F 7/00; G06F 17/00
(52) U.S. Cl. ........................ 707/104.1; 707/102; 707/1; 53/474; 700/216
(58) Field of Search ............................. 707/104.1, 102, 707/1; 53/472, 473, 474, 445, 168; 700/217, 216; 705/8, 28, 401, 406

(56) References Cited

U.S. PATENT DOCUMENTS

| | | | |
|---|---|---|---|
| 3,705,410 A | | 12/1972 | Kooy et al. |
| 4,672,553 A | * | 6/1987 | Goldberg .................... 700/216 |
| 4,692,876 A | * | 9/1987 | Tenma et al. ................ 700/249 |
| RE33,416 E | | 10/1990 | Konishi et al. |
| 5,038,283 A | * | 8/1991 | Caveney ....................... 705/28 |
| 5,175,692 A | | 12/1992 | Mazouz et al. |
| 5,246,332 A | * | 9/1993 | Bernard et al. .............. 414/807 |
| 5,291,396 A | | 3/1994 | Calcerano et al. |
| 5,379,229 A | | 1/1995 | Parsons et al. |
| 5,406,770 A | * | 4/1995 | Fikacek .......................... 53/54 |
| 5,415,518 A | | 5/1995 | Montgomery |
| 5,422,861 A | | 6/1995 | Stringer et al. |
| 5,430,831 A | | 7/1995 | Snellem |
| 5,493,491 A | | 2/1996 | Calcerano et al. |
| 5,501,571 A | | 3/1996 | Van Durrett et al. |
| 5,593,269 A | * | 1/1997 | Bernard, II ............. 414/331.04 |
| 5,613,826 A | | 3/1997 | Scott |
| 5,656,799 A | * | 8/1997 | Ramsden et al. ............... 177/2 |
| 5,720,157 A | * | 2/1998 | Ross ........................... 53/445 |
| 5,844,807 A | | 12/1998 | Anderson et al. |
| 5,850,370 A | | 12/1998 | Stringer et al. |
| 5,908,283 A | | 6/1999 | Huang et al. |
| 6,026,378 A | * | 2/2000 | Onozaki ....................... 705/28 |
| 2001/0017023 A1 | * | 8/2001 | Armington et al. ........... 53/472 |

FOREIGN PATENT DOCUMENTS

| | | | | |
|---|---|---|---|---|
| JP | 07309441 A | * | 11/1995 | ........... B65G/57/03 |

* cited by examiner

*Primary Examiner*—Safet Metjahic
*Assistant Examiner*—Brian Goddard
(74) *Attorney, Agent, or Firm*—Ian C. McLeod

(57) ABSTRACT

The present invention provides a computer-implemented method and system for optimally packing a plurality of randomly sized and shaped articles into a container. In particular, the invention determines the preferred packing configuration in a preferred container for packing a plurality of randomly sized and shaped articles in a customer order wherein particular articles in the order have specialized shipping requirements. In determining the preferred packing configuration, the method and system uses criteria based upon particular characteristics of the articles, the cost of packing labor, packing material, and delivery of the packed container. In a particular embodiment, the preferred packing configuration is displayed graphically or as written instructions and the container is packed manually.

73 Claims, 43 Drawing Sheets

MLP

Close    Home

Choose an Order [ 1 ▽ ] Enter an Order

Separate Order

Get Weights

Get Dimensions

Find Packaging

Find Carrier

View Packaging

Packaging [ mBox ▽ ]

Part # [ iar414 ▽ ]

| | OrderNumber | Group | PartNumber | Height | Width | Length | Shape |
|---|---|---|---|---|---|---|---|
| ▷ | | 1 | 2 | mBox | 13 | 13 | 13 | |

| MLP | | | | Order # | 5 |
|---|---|---|---|---|---|
| | | | | Group # | 2 |
| Close | Home | Enter an Order | View All Reports | Carton # | pt86 |

Separate Order

Get Weights                                        # of Cartons       2

Get Dimensions – Summary    Get Dimensions – Detail        Packaging  pt86

Find Packaging              Find Packaging – Girth and Weight    Item #  jar414   1

Find Carrier **                                                 Item #  jar414   1

Cost Factors **                                                 Item #  jar414   1

Item #  jar414   1

Make HTML                                                       Item #  jar414   1

View Packaging

| Order Header | Order Details | Separation | Weights | Boxes | Dimensional | Carrier |

| Item Number | QTY Required | Comment | | # of Items | 6 |
|---|---|---|---|---|---|
| jar414 | 1 | | | | |
| pt86 | 1 | | | | |
| Phone1 | 1 | | | | |

Record:  1  of 6

|   | MLP | | | Order # | 5 |
|---|---|---|---|---|---|
| | | | | Group # | 2 |
| Close | Home | Enter an Order | View All Reports | Carton # | pt86 |

Separate Order
Get Weights                                              # of Cartons         2
Get Dimensions – Summary    Get Dimensions – Detail     Packaging  pt86
Find Packaging              Find Packaging – Girth and Weight    Item #  jar414   1
Find Carrier **                                          Item #  jar414   1
Cost Factors **                                          Item #  jar414   1
                                                         Item #  jar414   1
Make HTML                                                Item #  jar414   1

View Packaging

| Order Header | Order Details | Separation | Weights | Boxes | Dimensional | Carrier |

FIG. 19

| MLP -- Part Information | | | | | | | |
|---|---|---|---|---|---|---|---|
| Close | | | | | | | |
| Part Number: Book | | | | Add a Part Number | | | |
| Part Description: Book | | | | | | | |
| Level: 1.0 | | | | | | | |
| Cost: $0.0000 | | | | | | | |
| Status: Current  Define Part Status | | | | | | | |
| Path to Image: book  Open the Image | | | | | | | |
| Shape | Width | Height | Length | Diameter | Weight | FragileRating | Environm |
| ▷ Rectangular | 2 | 4 | 0.5 | 0 | 0 | Very Durable | Diverse |
| * | 0 | 0 | 0 | 0 | 0 | | |

Draw the Image

FIG. 20

MLP -- Define Packaging Data

Close    Home

Packaging Part Number: mBox    Vendor: jadian, technologies    Add a Vendor

Packaging Description: Medium Box

All Measurements are in inches    ◉ Inches    ◉ Millimeters

Length: 13    Top Diameter:

Height: 13    Bottom Diameter:

Width: 13

Shape: 
- Rectangular
- Disk
- Triangular
- Sphere
- Cylinder
- Cone

Define a Shape

All Weights are in Pounds    ◉ Inches    ◉ Kilograms

Tare Weight: 0.5

Maximum Weight: 250

Image File Name: C:\program files\ps\images\packaging\mbox.gif    Open Image

Record: 1 of 3

Form View

FIG. 23

| | MLP -- Carrier Information | | | | | | |
|---|---|---|---|---|---|---|---|

Close    Home

Company Name: FedEx
Billing Address:
Address2:
SuiteNumber:
City:
State/Province:          Postal Code:          Country:

Type: carrier

| | BeginWeight | EngWeight | BeginDimensio | EndDimensio | Restriction1 | Restriction2 | Restriction3 | Restrictio |
|---|---|---|---|---|---|---|---|---|
| ▷ | 0 | 1 | 0 | 0.5 | | | | |
| | 1.1 | 2 | 0.6 | 1 | | | | |
| | 2.1 | 3 | 1 | 1.5 | | | | |
| * | 0 | 0 | 0 | 0 | | | | |

Record: |◁◁| 1 |▷▷*| of 3

FIG. 24

|   | MLP |
|---|---|

Close   Home   Add a Customer

Order Number: 1
Order Date: 10/25/00
Due Date: 11/1/00
Customer: jadian, inc.
Contact Number: ☑ Documentation Required   Reference Document:
P.O. Number:
FOB:
Shipment Method:

Item Information | Special Instructions

| Item Number | QTY Required | Comment |
|---|---|---|
| jar414 | 1 | |
| pt86 | 4 | |
| jar414 | 3 | |
| | 0 | |

Record: |◁| ◁ | 1 | ▷ | ▷| | ▷* | of 3

Record: |◁| ◁ | 1 | ▷ | ▷| | ▷* | of 6

FIG. 27

MLP -- Customer Information                                          3

Close      Home

Company Name:  jadian, Inc.
Billing Address:  P.O. Box 7
Address2:      6356 E. Saginaw Hd
SuiteNumber:
City:          Grand Ledge
State/Province: MI        Postal Code:  48837    Country:  U.S.A.

Type:          Customer  ▼

FIG. 30

```
┌──────────────────────────────────────────────────────────┐
│ ▦▦║MLP  ──  Vendor  Information              ┌────────3│ │
│Close    Home                                             │
│                                                          │
│   Company Name: [Presort Sevices            ]            │
│   Billing Address: [6356 Contect            ]            │
│   Address2:    [          ]                              │
│   SuiteNumber: [          ]                              │
│   City:        [Lansing                     ]            │
│   State/Province: [MI    ]  Postal Code: [48910]  Country: [U.S.A.] │
│                                                          │
│   Type:        [Vendor  ▼]                               │
│                                                          │
│                                                          │
└──────────────────────────────────────────────────────────┘
```

FIG. 31

|   | MLP — Separation Definitions |
|---|---|
| Close    Home | |
| Separation Description: | Chemical |
| Separation Comment: | Must be Packed with Other Chemicals |

FIG. 33

MLP — Separation Definitions

Close  Home

Shape Description: Rectangular
Shape Comment:

Area Equation: Rectangular
Volume Equation: Rectangular
Area Equation: Rectangular
Area Equation: Rectangular
Area Equation: Rectangular Record: |◁| ◁  1  ▷ ▷| ▷* of 6

FIG. 34

```
┌─────────────────────────────────────────────────────────┐
│ ═╗  ║ MLP  —  Durability Definitions                    │
│ Close      Home                                         │
│                                                         │
│   Shape Description:  ┌──────────────────┐              │
│                       │ Very Fragile     │              │
│   Shape Comment:      ┌──────────────────────────────┐  │
│                       │ Must be Packed Alone         │  │
│                       │                              │  │
│                       │                              │  │
│                       └──────────────────────────────┘  │
│                                                         │
│                                                         │
│                                                         │
│                                                         │
│                                                         │
│   Record:  |◁ ◁       1   ▷ ▷| ▷*  of 5                 │
└─────────────────────────────────────────────────────────┘
```

Weights

Order# 1

| Part Number | Part Description | QTY Required | Weight | Total Part Weight | |
|---|---|---|---|---|---|
| jar414 | Glass Apothecary Ja | 1 | 3 | 3 | Pounds |
| pt86 | Margarita Mix | 4 | 6.75 | 27 | Pounds |

Order# 2

| Part Number | Part Description | QTY Required | Weight | Total Part Weight | |
|---|---|---|---|---|---|
| jar414 | Glass Apothecary Ja | 23 | 3 | 69 | Pounds |

Order# 3

| Part Number | Part Description | QTY Required | Weight | Total Part Weight | |
|---|---|---|---|---|---|
| pt86 | Margarita Mix | 3 | 6.75 | 20.25 | Pounds |

Order# 4

| Part Number | Part Description | QTY Required | Weight | Total Part Weight | |
|---|---|---|---|---|---|
| jar414 | Glass Apothecary Ja | 3 | 3 | 9 | Pounds |
| pt86 | Margarita Mix | 2 | 6.75 | 13.5 | Pounds |

Order# 5

FIG. 40

Separate Order

| Separate Order | | | |
|---|---|---|---|
| Order# 5 | Fragile Requirements | Part Number | |
| Group | 2 — Food | | |
| | Fragile | jar414 | Glass Apothecary Jar |
| | Above Average | pt86 | Margarita Mix |
| Group | 4 — Diverse | | |
| | Fragile | Phone1 | Cellular Phone Packed in S |
| | Very Durable | Book | Book |

Get Weights

| Weights | | | | | |
|---|---|---|---|---|---|
| Order# 5 | | | | | |
| Part Number | Part Description | QTY Required | Weight | Total Part Weight | |
| Book | Book | 1 | 0 | 0 | Pounds |
| jar414 | Glass Apothecary Ja | 1 | 3 | 3 | Pounds |
| Phone1 | Cellular Phone Packe | 1 | 0.5 | 0.5 | Pounds |
| pt86 | Magarita Mix | 1 | 6.75 | 6.75 | Pounds |

FIG. 41

Detailed Dimensions

| | | | | | | | | | | | | |
|---|---|---|---|---|---|---|---|---|---|---|---|---|
| Group Detailed Dimensions | | | | | | | | | | | | |
| 5 | | | | | | | | | | | | |
| OrderNum | ItemNumb | PartDescr | Group | Rating | Y Required | Width | Height | Length | PartVolume | TotalVolume | Weight | TotalWeight |
| | Phone1 | Cellular | 4 | 2 | 3 | 2 | 4 | 4 | 32 | 96 | 0.5 | 1.5 |
| | Phone1 | Cellular | 4 | 2 | 1 | 2 | 4 | 4 | 32 | 32 | 0.5 | 0.5 |
| | Book | Book | 4 | 5 | 1 | 2 | 4 | 0.5 | 4 | 4 | 0 | 0 |
| | Book | Book | 4 | 5 | 1 | 2 | 4 | 0.5 | 4 | 4 | 0 | 0 |
| | Book | Book | 4 | 5 | 1 | 2 | 4 | 0.5 | 4 | 4 | 0 | 0 |
| | Book | Book | 4 | 5 | 1 | 2 | 4 | 0.5 | 4 | 4 | 0 | 1.5 |
| | Phone1 | Cellular | 4 | 2 | 3 | 2 | 4 | 4 | 32 | 96 | 0.5 | 1.5 |
| | Phone1 | Cellular | 4 | 2 | 1 | 2 | 4 | 4 | 32 | 32 | 0.5 | 0.5 |
| | pt86 | Margari | 2 | 4 | 1 | 8 | 7 | 7 | 392 | 392 | 6.75 | 6.75 |
| | jar414 | Glass A | 2 | 2 | 1 | 4.25 | 4.25 | 4.25 | 76.766 | 76.766 | 3 | 3 |

FIG. 42

Summary Dimensions

| Group Summary Dimensions | | | | | | | | |
|---|---|---|---|---|---|---|---|---|
| OrderNumber | Group | ItemNumb | umOfWidth | umOfHeight | umOfLength | PartVolume | otelVolume | mOfWeight | OfTotalWeight |
| 5 | 2 | | | | | | | | |
| | | jar414 | 4.25 | 4.25 | 4.25 | 76.76563 | 76.76563 | 3 | 3 |

FIG. 43

Get Boxes

| Choose the Boxes | | |
|---|---|---|
| OrderNumber | Group | Carton# |
| 5 | 4 | sBox |
| | 2 | pt86 |

FIG. 44

Get Boxes

| Choose the Box – Girth and Dim Weight | | | |
|---|---|---|---|
| OrderNumber | Group | MinOfMinOfGirth | MinOfMinOfWeight | Carton# |
| 5 | 2 | 34.5 | 1.80412371134021 | pt86 |
| | 4 | 15 | 0.139175257731959 | sBox |

FIG. 45

METHOD AND SYSTEM FOR PACKING A PLURALITY OF ARTICLES IN A CONTAINER

CROSS-REFERENCES TO RELATED APPLICATION

This application claims priority to Provisional Patent Application No. 60/200,240, filed Apr. 28, 2000.

STATEMENT REGARDING FEDERALLY SPONSORED RESEARCH OR DEVELOPMENT

Not Applicable.

REFERENCE TO A "COMPUTER LISTING APPENDIX SUBMITTED ON A COMPACT DISC"

A Computer Program Listing Appendix of the programming language, which can be used to practice the packing system of the present invention, is submitted with this application on two identical compact discs (CD). The compact discs are labeled Copy 1 and Copy 2 Each compact disc is entitled "010427_1148" and each is hereby incorporated herein by reference.

The CDs are write-only and are IBM-PC and MS-WINDOWS compatible. Each compact disc contains an ASCII text file entitled "PackagingSolutions" (PACKAG~6.TXT) disclosing a computer program which can be used to practice the method and system of the present invention.

The file was created Apr. 27, 2001, and the file contains 340,054 bytes.

The file "PackagingSolutions" (PACKAG~6.TXT) comprises the following computer program codes and files: (1) Table:1da, created Dec. 18, 2000, (2) Table: tblCarrierSchedules, created Dec. 8, 2000, (3) Table; tblCompanies, created Jul. 8, 2000, (4) Table: tblDimensionalData, created Jul. 8, 2000, (5) Table: tblFill, created Dec. 8, 2000, (6) Table; tblFragility, created Dec. 8, 2000, (7) Table: tblImages, created Oct. 22, 2000, (8) Table: tblIndustries, created Jul. 8, 2000, (9) Table: tblJournal, created Jul. 8, 2000, (10) Table: tblPackagingData, created Dec. 8, 2000, (11) Table: tblPackagingUsed, created Dec. 8, 2000, (12) Table: tblPairedData, created Feb. 1, 2001, (13) Table: tblPartInformation, created Jul. 8, 2000, (14) Table: tblPeople, created Jul. 8, 2000, (15) Table: tblPicturesAuditQuestion, created Feb. 1, 2001, (16) Table: tblPicturewithAudits, created Feb. 1, 2001, (17) Table: tblProductionOrderHeader, created Oct. 25, 2000, (18) Table: tblProductionOrderLine, created Oct. 25, 2000, (19) Table: Separations, created Dec. 8, 2000, (20) Table: tblShapes, created Dec. 8, 2000, (21) Table: tblTypeCompanies, created Dec. 8, 2000, (22) Table: tblTypeImages, created Oct. 22, 2000, (23) Table: tblTypesPartStatus, created Oct. 22, 2000, (24) Query: qurBoxorderData, created Feb. 8, 2001, (25) Query:

qurCalculateDimWeightGirth, created Dec. 21, 2000, (26) Query: qurCarrierMax, created Dec. 8, 2000, (27) Query: qurChooseBoxes, created Feb. 8, 2001, (28) Query: qurChooseBoxGirth, created Feb. 8, 2001, (29) Query: qurChooseBoxGirthandDimW, created Feb. 28, 2001, (30) Query: qurGetDimensions, created Dec. 8, 2000, (31) Query: qurGetgroupDetailedDimensions, created Dec. 21, 2000, (32) Query:

qurGetgroupSummaryDimensions, created Dec. 21, 2000, (33) Query: qurGetPossibleBoxes, created Dec. 21, 2000, (34) Query: qurGetPossibleBoxGirthDimWeights, created Dec. 21, 2000, (35) Query: qurgetweights, created Dec. 8, 2000, (36) Query: qurOrderDetail, created Dec. 21, 2000, (37) Query:

qurOrderDimensions, created Dec. 8, 2000, (38) Query: qurPackagingUsedDetail, created Dec. 8, 2000, (39) Query: qurPackagingUsed Summary, created Dec. 8, 2000, (40) Query: queseparateorder, created Dec. 8, 2000, (41) Query: qurWeighGroups, created Dec. 8, 2000, (42) Form: 000temp, created Aug. 8, 2000, (43) Form: frmAddImage, created Oct. 22, 2000, (44) Form: frmAdministration, created Oct. 22, 2000(45) Form: frmCariers, created Dec. 8, 2000, (46) Form: frmCharacteristics, created Dec. 8, 2000, (47) Form: frmCustomers, created Oct. 25, 2000, (48) Form: frmDefinePartStatus, created Oct. 22, 2000, (49) Form: frmDefineTypesImages, created Oct. 22, 2000, (50) Form: frmEnterAnOrder, created Oct. 25, 2000, (51) Form: frmFill, created Dec. 8, 2000, (52) Form: frmFragility, created Dec. 8, 2000, (53) Form: frmGetPictureName, created Feb. 1, 2001, (54) Form: frmHome, created Aug. 3, 2000, (55) Form: frmKaizen, created Oct. 25, 2000, (56) Form: frmListorders, created Oct. 17, 2000, (57) Form: frmpackagingData, created Oct. 25, 2000, (58) Form: frmPackImage1, created Feb. 8, 2001, (59) Form: frmPictureManagement, created Feb. 1, 2001, (60) Form: frmPicturesAuditReport, created Feb. 1, 2001, (61) Form: frmPicturewithAuditQuestions, created Feb. 1, 2001, (62) Form: frmPrintLabels, created Oct. 25, 2000, (63) Form: frmProcessWalkThrough, created Feb. 8, 2001, (64) Form: frmReports, created Oct. 25, 2000, (65) Form: SelectOrder, created Oct. 17, 2000, (66) Form: frmSeparations, created Dec. 8, 2000, (67) Form: frmShapes, created Dec. 8, 2000, (68) Form: frmUser, created Oct. 17, 2000, (69) Form: frmVendors, created Dec. 8, 2000, (70) Form: frnparts, created Aug. 3, 2000, (71) Form:

MsysCompactError subform, created Feb. 8, 2001, (72) Form: qurBoxorderData subform, created Feb. 8, 2001, (73) Form: qurCalculateDimWeightGirth subform, created Feb. 8, 2001, (74) Form: qurChooseBoxes subform, created Feb. 8, 2001, (75) Form: tblCarrierSchedules subform, created Dec. 8, 2000, (76) Form: tblCharSpecs subform, created Aug. 3, 2000, (77) Form: tblDimensionalData subform, created Dec. 8, 2000, (78) Form: tblFragility, created Feb. 8, 2001, (79) Form: tblproductionOrderLine subform, created Oct. 25, 2000, (80) Form: tblproductionOrderLine subform, created Feb. 9, 2001, (81) Report: qurGetWeights, created Dec. 8, 2000, (82) Report: qurpartDimensions, created Oct. 25, 2000, (83) Report: qurSeparateOrder, created Dec. 8, 2000, (84) Macro: mcrMaximize, created Oct. 17, 2000, (85) Macro: mcrRemovePictures, created Feb. 8, 2001, (86) Database: \\Raven\ravensn\PS\oppack.mbd, (87) Relationships, (88) Table: ImageHTML, created Apr. 9, 2001, (89) Table: tblHTMLData, created Feb. 21, 2001, (90) TableHTMLDataImages, created Mar. 3, 2001, (91) Table: tblHTMLDataStraightPage, created Feb. 21, 2001, (92) Table: tblOrderDetailStretch, created Apr. 23, 2001, (93) Table: tempOrderDetailStretch, created Apr. 9, 2001, (94) Table: tempOrderItems, created Apr. 9, 2001, (95) Query: GetCarriers, created Mar. 3, 2001, (96) Query: Maketableformat, created Apr. 9, 2001, (97) Query: qurAddHTMLBottom, created Apr. 20, 2001, (98) Query: qurAddImageBox, created Apr. 23, 2001, (99) Query: qurAddImageHTML, created Apr. 20, 2001, (100) Query: qurFilestoCopy, created Apr. 20, 2001, (101) Query: qurHTMLOnly, created Feb. 21, 2001, (102) Query: qurHTMLOnly2, created Apr. 20, 2001, (103) Query: qurHTMLVariable, created Feb. 21, 2001, (104) From:

frmMakeImageHTML, created Apr. 9, 2001, (105) Form: qurContainers, created Apr. 20, 2001, (106) Form: tblOrderPositionTemp, created Apr. 9, 2001, (107) Form: tempOrderDetail subform, created Apr. 9, 2001, (108) Form: tempOrderDetailStretch, created Apr. 9, 2001, (109) Form: tempOrderDetailStretch1, created Apr. 9, 2001, (110) Form: tempOrderItems, created Apr. 9, 2001, (111) Table: tblQTYs, created Apr. 25, 2001, and (112) Query: qurDoNotUse, created Apr. 27, 2001.

BACKGROUND OF THE INVENTION (1) Field of the Invention

The present invention relates to a computer-implemented method and system for optimally packing a plurality of randomly sized and shaped articles into a container or containers. In particular, the invention determines the preferred packing configuration in a preferred container for packing a plurality of randomly sized and shaped articles in a customer order wherein particular articles in the order have specialized shipping requirements. In determining the preferred packing configuration, the method and system uses criteria based upon particular characteristics of the articles, the cost of packing labor, availability of containers, packing material, and delivery of the packed container. In a preferred embodiment, the optimal or preferred packing configuration is displayed graphically or as written instructions and the container is packed manually. The method and system can also create a historical database for the preferred packing configuration which adds intelligence back into the system.

(2) Description of Related Art

Packing and shipping customer orders is an important part of the ordering process in the retail catalog, direct mail, part supplier, wholesale shipping, Internet or e-commerce, catalogue fulfilment, and distribution industries. While many parts of the ordering process have been computerized, most companies in the above industries still employ human packers to make the final choice of which container to use for an order and how to pack that container. As a result, packing and shipping customer orders remains inefficient and more costly than it needs to be.

Packing and shipping customer orders is one of the several functions that are embraced by the art of warehouse management. Warehouse management includes all operations of a warehouse such as ordering and receiving inventory, storing inventory, maintaining particular inventory levels, and disposition of the inventory, which includes packing and shipping customer orders. While packing and shipping customer orders is an important function within the art of warehouse management, the art of warehouse management has remained focused on the field of automated systems for stacking or storing containers. The following U.S. Patents are representative of the current state and focus of warehouse management.

U.S. Pat. No. 3,705,410 to Kooy et al. discloses a data processing system that optimizes storage for pallets. U.S. Pat. No. RE34,416 to Konishi et al. discloses a pile planning system for three-dimensional objects for maximizing the amount of vacant space available on a pallet. U.S. Pat. No. 5,175,692 to Mazouz et al. shows a method of loading a pallet with randomly-sized objects. U.S. Pat. No. 5,291,396 to Calcerano et al. is representative of a number of patents disclosing a method of storing rectangular-shaped objects into the least amount of space for storage. U.S. Pat. No. 5,379,229 to Parsons et al. shows a system of storing and retrieving three-dimensional objects in a given area. U.S. Pat. No. 5,415,518 to Montgomery discloses a system for palletizing bundles of books in an efficient manner. U.S. Pat. No. 5,422,861 to Stringer et al. discloses an apparatus used to scan an object in order to measure its three dimensions. U.S. Pat. No. 5,430,831 to Snellem discloses a method of packing two-dimensional and three-dimensional objects into a rectangular space so as to optimize the area given. U.S. Pat. No. 5,493,491 to Calcerano et al. discloses a method of storing rectangular-shaped objects into the least amount of space for storage. U.S. Pat. No. 5,501,571 to Van Durrett et al. discloses an automated palletizer for different size and weight boxes. U.S. Pat. No. 5,613,826 to Scott discloses a system for maximizing the stacking efficiency of objects. U.S. Pat. No. 5,720,157 to Ross discloses an order control system for dispensing a preselected number of items in a particular sequence as requested. U.S. Pat. No. 5,844,807 to Anderson et al. discloses a method of stacking objects so as to match the outside dimensions of a pallet. U.S. Pat. No. 5,850,370 to Stringer et al. discloses a laser guided system for measuring objects in three dimensions. U.S. Pat. No. 5,908,283 to Huang et al. discloses a system for palletizing rectangular-sized objects of random sizes and weights.

While the above patents address particular warehouse management problems related to stacking or storing containers, none address the problems relating to packing and shipping customer orders. Such problems include low productivity and efficiency due to packer uncertainty as to the proper shipping container to use, high packing costs because inappropriate or wrong-sized containers were used for shipping, improper packing of containers that results in damage to the packed articles, and high shipping costs because an inappropriate shipper was used for shipping a particular packed container. Therefore, there remains a need for a packing method and system that will boost productivity and efficiency, reduce packing and shipping costs, and reduce the likelihood that the packed articles will be damaged during shipping.

SUMMARY OF THE INVENTION

The present invention provides a computer-implemented method and system for optimally packing a plurality of randomly sized and shaped articles into a container. In particular, the invention determines the preferred packing configuration and preferred container for packing a plurality of randomly sized and shaped articles in a customer order wherein particular articles in the order have specialized shipping requirements. In determining the preferred packing configuration, the method and system uses criteria based upon particular characteristics of the articles, the cost of packing labor, packing material, and delivery of the packed container. In a preferred embodiment, the optimal or preferred packing configuration is displayed graphically or as written instructions and the container is packed manually. The method and system can also create a historical database for the preferred packing configuration which adds intelligence back into the system.

The general flow of the packing system of the present invention consists of taking an order from a customer and determining the most cost effective or preferred packing configuration for shipping the order to the customer. The system determines the preferred packing configuration based upon one or more of the following factors: the number of articles in the customer's order, particular indicia of the articles in the customer's order such as weight and dimensions, and other indicia of the articles such as restrictions, limitations, and rules for particular articles in the customer order, e.g., fragility, compatibility . The packing system then determines the number of containers needed to ship the order in view of the shipping and delivery options available.

The packing system of the present invention then selects the most preferred packing configuration based on the labor, delivery, and packing costs. The packing system provides instructions for packing the articles in the customer order and for shipping the customer's order. In a preferred embodiment, the packing system graphically displays the preferred packing configuration and provides written instructions for the preferred packing configuration. In an optional embodiment, the packing system selects a second preferred packing configuration. The packing system further enables the packer to input information about the packing configuration that was determined. The inputted information is available for use by the packing system whenever a customer order comprises the same or similar articles or containers and for evaluating performance of the packing system.

Therefore, the present invention provides a computer implemented method for preferably placing one or more articles from a customer order into a container preferably suited for receiving the articles, comprising: (a) inputting indicia for a plurality of articles into a memory of a programmed computer to produce an article database; (b) inputting indicia for a plurality of containers for receiving the articles into the memory of the programmed computer to produce a container database; (c) selecting the indicia corresponding to the articles in the customer order from the article database; (d) selecting the indicia corresponding to one or more selected containers in the container database; (e) generating a plurality of possible packing configurations based on the indicia of the articles in the customer's order and the indicia for one or more of the selected containers; (f) selecting from the plurality of possible packing configurations a preferred packing configuration including a preferred arrangement of the articles in a particular container; (g) generating instructions for packing the one of the selected containers using the preferred packing configuration; and, (h) packing the articles from the customer order in the one of the selected containers according to the instructions.

The present invention further provides a computer implemented method for determining the preferred packing of one or more articles from a customer order into a container suited for receiving the articles, comprising: (a) inputting into a programmed computer an identifier for each article in the customer order; (b) retrieving data including indicia for each article corresponding to the identifier from an article database containing indicia for a plurality of articles stored in memory of the programmed computer; (c) retrieving data including indicia for one or more containers from a container database stored in the memory of the programmed computer; (d) generating a plurality of possible packing configurations based on the indicia for the articles and the indicia for the one or more containers; (e) selecting a preferred packing configuration from the plurality of possible packing configurations having a preferred arrangement of the articles of the customer order in a particular container; (f) generating instructions for packing the particular container in the preferred packing configuration; and, (f) packing the particular container with the one or more articles from the customer order according to the instructions.

Further still, the present invention provides a method for packing articles from a customer order into a container suited for receiving the articles, comprising: (a) inputting customer order data into an order entry system in a programmed computer; (b) converting the customer order data in the order entry system to a language that enables the data to be portable across computer applications and computer operating systems; (c) retrieving from an article database indicia for the articles ordered and from a container database indicia for one or more containers wherein the article and container indicia are in a language that enables the indicia to be portable across computer applications and computer operating systems; (d) generating using the programmed computer a plurality of possible packing configurations based on the indicia for the articles from the customer order and the indicia for the one or more containers using a program code that is independent of an operating system of the programmed computer; (f) selecting a preferred packing configuration from the plurality of possible packing configurations; (g) generating using the programmed computer instructions for the preferred packing configuration including a preferred arrangement of the articles from the customer order in a particular container; and (h) packing the articles from the customer order in the preferred arrangement in the particular container according to the instructions.

In the above methods, the present invention preferably includes retrieving from a carrier delivery and rate database, indicia consisting of carrier delivery and rate data based on dimensions of one or more containers and weight of one or more containers for each dimension and weight category accepted by a carrier. In the preferred embodiment, the present invention further includes retrieving from a labor cost database, indicia consisting of labor costs associated with each of the plurality of possible packing configurations.

In the above methods, the indicia for the articles from the customer order are selected from data from the group consisting of length, width, height, weight, fragility, composition, flexibility, health factors, safety factors, packing material to protect the article, and combination thereof, and the indicia for the containers are selected from data from the group consisting of length, width, height, weight, material, and combination thereof. In a preferred embodiment, the plurality of packing configurations is further based on compatibility of the articles from the customer order. In a preferred embodiment further still a second preferred packing configuration is selected. In the preferred embodiment, the packing instructions provide a visual representation of the preferred packing configuration and written instructions for the preferred packing configuration, which preferably are displayed on a computer screen, and the packing is conducted manually. The above methods can further include a packing history database that is then accessed when a subsequent preferred packing configuration is being generated.

Further, in the method of the present invention, the database uses a structured query language; the possible packing configurations are generated using a programming language that is independent of an operating system of the programmed computer; and the preferred packing configuration is provided in extensible markup language to enable data representing the preferred packing configuration to be portable across different types of applications and operating systems, and in extensible stylesheet language to enable the preferred packing configuration to be presented in different formats.

The present invention further provides a system for placing one or more articles from a customer order into a container suited for receiving the articles, comprising: (a) means for inputting indicia for a plurality of articles into a memory of a programmed computer to produce an article database; (b) means for inputting indicia for a plurality of containers for receiving the articles into the memory of the programmed computer to produce a container database; (c) means for selecting the indicia corresponding to the articles in the customer order from the article database; (d) means for selecting the indicia corresponding to one or more of the containers in the container database; (e) means for generating a plurality of possible packing configurations based on the indicia for each of the articles from the customer order and the indicia for one or more of the containers; (f) means for selecting from the plurality of possible packing configurations a preferred packing configuration consisting of a preferred arrangement of the articles from the customer order in a particular container; and (g) means for generating instructions for packing the particular container with the articles from the customer order in the preferred arrangement using the preferred packing configuration wherein the system enables packing the articles in the particular container according to the instructions.

The present invention further provides a computer implemented system for determining a preferred packing arrangement of articles from a customer order into a container preferably suited for receiving the articles, comprising: (a) means for inputting an identifier for each article of the customer order into a memory of a programmed computer; (b) means for storing and retrieving indicia for a plurality of articles in the memory of the programmed computer; (c) means for storing and retrieving indicia for one or more containers stored in the memory of the programmed computer; (d) means for generating a plurality of possible packing configurations based on the indicia for each article of the customer order and the indicia for one or more of the containers; (e) means for selecting a preferred packing configuration from the plurality of possible packing configurations having a preferred arrangement of the articles of the customer order in a particular container; and (f) means for generating instructions for packing the particular container wherein the system enables packing of the particular container with the articles of the customer order in the preferred arrangement using the preferred packing configuration.

Further still, the present invention provides a system for packing articles from a customer order into a container suited for receiving the articles, comprising: (a) means for inputting customer order data into an order entry system in a programmed computer; (b) means for converting the customer order data in the order entry system to a language that enables the data to be portable across computer applications and computer operating systems; (c) means for retrieving from a database indicia for the articles from the customer order and indicia for one or more containers wherein the indicia are in a language that enables the indicia to be portable across computer applications and computer operating systems; (d) means for generating in the programmed computer a plurality of possible packing configurations based on the indicia using a program code that is independent of an operating system of the programmed computer; (e) means for selecting a preferred packing configuration from the plurality of possible packing configurations; and (f) means for generating instructions for the preferred packing configuration including a preferred arrangement of the articles from the customer order in a particular container wherein the system enables packing the particular container according to the instructions.

In the packing system of the present invention, it is preferable that packing system further include a means for retrieving from a delivery and rate database indicia for carrier delivery and rate data based on dimensions of each of one or more containers and weight of each of the one or more containers for each dimension and weight category accepted by a carrier, and a means for retrieving from the database indicia consisting of labor costs associated with each of the plurality of possible packing configurations.

In the packing system of the present invention, the indicia for the articles are selected from data from the group consisting of length, width, height, weight, fragility, composition, flexibility, health factors, safety factors, packing material to protect the article, and combination thereof. In the packing system, the indicia for the container are selected from data from the group consisting of length, width, height, weight, material, and combination thereof.

Preferably, the means for generating the plurality of packing configurations considers compatibility of the articles in the customer order. Preferably, the means for selecting the preferred packing configuration is capable of selecting a second preferred packing configuration is selected.

In a preferred embodiment of the packing system of the present invention, the instructions provide a visual representation of the preferred packing configuration and written instructions for the preferred packing configuration, which is displayed on a computer screen, and the packing system further including a means for packing the particular container manually.

In the packing system of the present invention, the order entry system is preferably a Legacy system; the means for storing and retrieving the indicia uses a structured query language; and the means for generating the plurality of possible packing configurations uses a programming language that is independent of an operating system of the programmed computer. In the packing system, the preferred packing configuration is provided in extensible markup language to enable data representing the preferred configuration to be portable across applications and operating systems of different types, and in extensible stylesheet language to enable the preferred configuration to be presented in different formats.

Finally, the packing system can provide a means wherein the preferred packing configuration is stored in a packing history database that is then accessed when a subsequent preferred packing configuration is being generated.

Therefore, it is an object of the present invention to provide a computer implemented method and system that determines the optimal or preferred configuration for packing articles, in particular randomly sized and shaped articles, from a customer order into a particular container so as to reduce the time and costs associated with packing and shipping the articles in the customer order.

It is a further object of the present invention that instructions for the optimal or preferred packing configuration for a customer order be provided to a manual packer in a visual or textual format.

These and other objects will become increasingly apparent with reference to the following descriptions and the drawings.

DESCRIPTION OF THE DRAWINGS

FIG. 13 shows one embodiment of the screen display when "Process Walk Through" is selected.

FIG. 14 shows another embodiment of the "Process Walk Through" display screen.

FIG. 15 shows the display screen with the "Order Details" function selected.

FIG. 16 shows the display screen with the "Separation" function selected.

FIG. 18 shows the display screen with the "Boxes" function selected.

FIG. 19 shows the display screen with the "Carrier" function selected.

FIG. 20 shows the screen display which is displayed when "Define Part Information" is selected on the packaging home page shown in FIG. 12.

FIG. 23 shows a screen display for entering packaging information related to containers which is displayed when "Enter Packaging Information" is selected on the packaging home page shown in FIG. 12.

FIG. 24 shows a screen display for entering information related to carriers which is displayed when "Enter Carrier Information" is selected on the packaging home page in FIG. 12.

FIG. 27 shows a display screen which is displayed when "Enter an Order" is selected on the packaging home page in FIG. 12.

FIG. 30 shows the display screen for entering customer information when "Add a Customer" is selected.

FIG. 31 shows the display screen for entering vendor information when "Add a Vendor" is selected.

FIG. 33 shows the display screen for entering separation information for an article (whether particular articles cannot be packed in the same container) when "Define Separation" is selected.

FIG. 34 shows the display screen for entering shape definitions for an article when "Define Shapes" is selected.

FIG. 35 shows the display screen for entering durability information for an article when "Define Durability" is selected.

Figure 39:
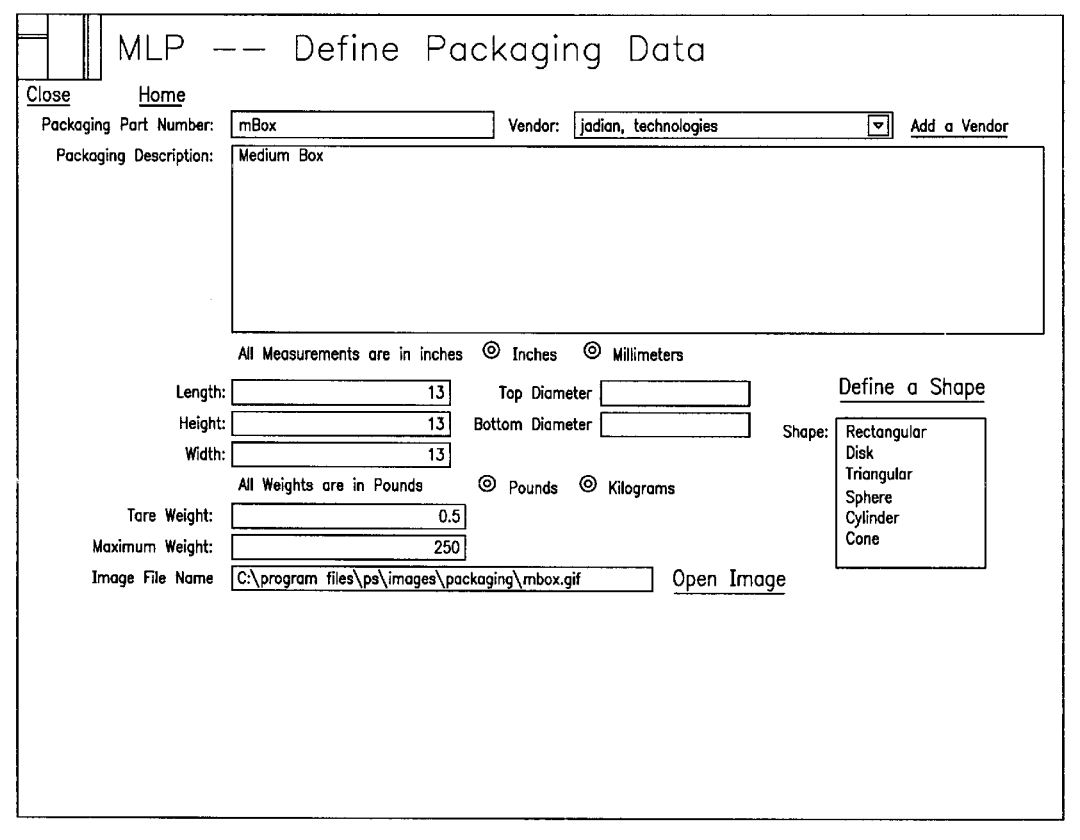

FIG. 39 shows the display screen for entering packaging information when "Define Packaging Data" is selected.

FIG. 40 shows a display screen which shows the total weight of each article in each of the customer orders.

FIG. 41 shows the reports for a particular customer order.

FIG. 42 shows a screen display of the "Detailed Dimensions" report which shows in detail the dimensions of each article in order 5.

FIG. 43 is a screen display which shows the "Summary Dimensions" report for customer order 5.

FIG. 44 is a screen display which shows the "Get Boxes" report for customer order 5.

FIG. 45 is a screen display which shows the "Get Boxes—Girth, Dimensions, and Weight" report for customer order 5.

DETAILED DESCRIPTION OF THE INVENTION

Figure 1:
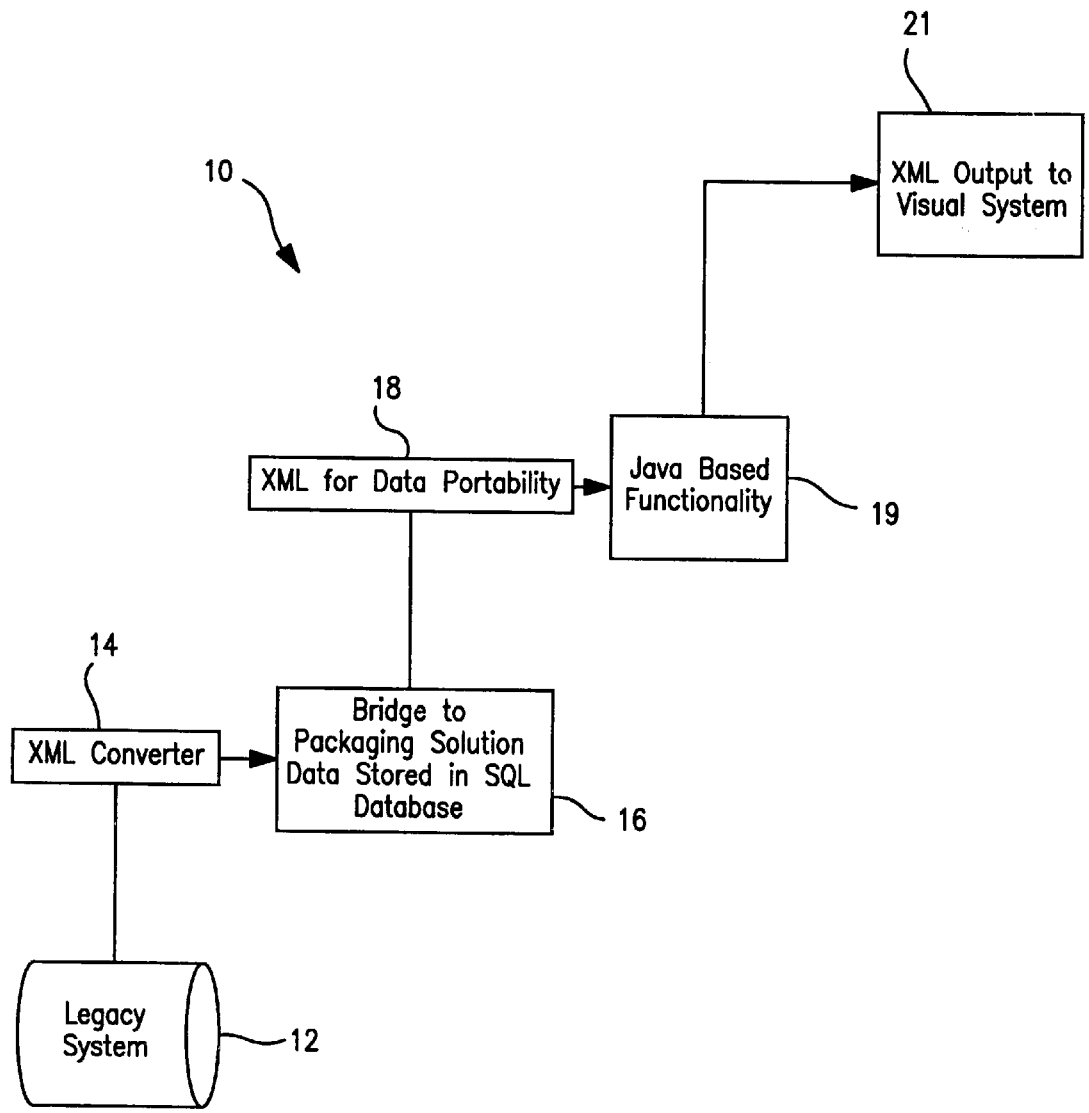
FIG. 1 is a schematic drawing showing the technology infrastructure of the system of the present invention.

All patents, patent applications, government publications, government regulations, and literature references cited in this specification are hereby incorporated herein by reference in their entirety. In case of conflict, the present description, including definitions, will control.

A computer program comprising sub-programs and files and which is one embodiment of a computer program that can be used to practice the present invention, is provided in the file entitled "PackagingSolutions" (PACKAG~6.TXT) set forth in the Appendix on a compact disc (CD) entitled "010427_1148". Two CDs have been provided. Each CD, designated as Copy 1 or Copy 2, is identical and each CD is hereby incorporated herein by reference. Each CD contains the computer program codes and files enumerated in Example 1.

While the computer programs and files in the Appendix can be used to practice the method and system of the present invention, the method and system of the present invention is not to be limited to the computer programs and files in the Appendix. Any computer programs and files that can be used to perform the method and system of the present invention in substantially the same manner as disclosed herein is within the scope of the present invention.

Definitions for the following terms are provided to promote a further understanding of the present invention.

The term "Java" refers to a programming language that is independent of a computer's operating system. Java enables the programming code to be portable and operable in computer operating systems different from that in which the program was created.

The term "legacy system" refers to any one of the order entry systems or warehouse management systems currently being used in the warehouse, catalog, and shipping industry.

The term "order entry system" refers to any one of the current legacy systems that are used to receive and process orders from customers.

The term "client side" refers to the computer hardware and software used by the user to interface with the main database on the server.

The term "server side" refers to the computer hardware and software that processes data to pass to the client side of the server so that the client side can take the data and create the interface.

The term "item" in the figures has the same meaning as the term "article" used herein.

The term "article dimension" refers to the physical characteristics of an article, which includes, but is not limited to, the length, width, height, radius, weight, angles, shape, etc. of the item.

The term "article specification" refers to characteristics of the article that affect the packing of the article. These characteristics include, but are not limited to, health and safety indicators, fragility of the article, and flexibility of the article.

The term "database" refers to any open database connectivity (ODBC) or Java open database connectivity (JODBC) of which SQL and Microsoft ACCESS are databases within ODBC or JODBC.

The term "SQL" refers to the specification for a database or data structure that uses structured query language to retrieve and manipulate data comprising the indicia for an article, a container, the delivery rate and schedules, and the labor costs. As used herein, the SQL database is a fundamental database that holds the data for the packing system.

The term "XML" refers to extensive markup language, which is a computer language used in computer programming to make data comprising indicia for an article, a container, the delivery rate and schedules, and the labor costs and data comprising packing configurations portable across computer applications or programs of different types and across different computer operating systems.

The term "XSL" refers to extensible stylesheet language, which is a computer language used to present data that is in XML in different formats such as graphic displays and written instructions.

The term "identifier" refers to any identifying means assigned to an article, which includes, but is not limited to, UPC number, product number bar code, SKU indentifier, catalog number, product number, serial number, and article name.

"Order tracking number" is an identification means assigned to a customer order. In many cases, the order tracking number will be the purchase order number.

The term "indicia" refers to the set of particular characteristics for an article, a container, the delivery rate and schedules, and the labor costs stored in a database. "Indicia" for an article include, but are not limited to, length, width, height, weight, fragility, composition of the article, flexibility, heath factors, safety factors, compatibility of articles, and packing material. "Indicia" for a container include, but are not limited to, length, width, height, weight, and material comprising the container.

The term "LCD" refers to liquid crystal diode, the term "CRT" refers to cathode ray tube, and the term "PD" refers to plasma display. All three terms represent means for visually displaying computer information on a computer screen or other device.

As used herein, the term "packing" and "packaging" are intended to have the same meaning and are used herein interchangeably.

The present invention provides a packing method and packing system that determines the optimal or preferred packing configuration in a preferred container for packing a plurality of randomly sized and shaped articles in a customer order wherein particular articles have specialized shipping requirements. In determining the preferred packing configuration the method and system uses criteria based upon particular characteristics of the articles, the cost of packing labor, packing material, and delivery of the packed container. A preferred feature of the present invention is that the preferred packing configuration is graphically displayed to a packer who then packs the container selected by the packing system in the configuration determined by the packing system. The present invention is particularly useful for companies and organizations that routinely ship randomly sized articles such as retail catalog companies, wholesale shipping companies, Internet or e-commerce companies, direct mail companies, part suppliers, catalogue fulfilment companies, and distribution companies.

In general, the packing system of the present invention operates as follows. The user receives and processes an order from a customer using the user's current order entry system. Through an interface between the order entry system and the packing system, the order data flows to the packing system of the present invention. The order data includes such information such as article identifiers, quantities ordered, customer delivery requirements, and the like. Preferably, the order data includes article characteristic and specification information such as the article's dimensions (length and width), its fragility, and its hazardousness. In general, this information will be in a database stored in the memory of the order entry system. However, if the user's order entry system is not able to store the above information, then the information is stored in a database within the packing system of the present invention.

There are several means that can be used to input the article characteristics and specifications into a database for use by the packing system. These means include receiving the information from the article's supplier in computer readable form or manually inputting the article's characteristics and specifications into the database. Alternatively, when the article is first entered into the user's inventory, the user uses a scanning device to input the article's characteristics and specifications into the database. Furthermore, the user can take a picture of the article and input the picture of the article into the database.

Once the above information is entered into the database, the information is accessed by the packing system to determine the optimal packing configuration for a customer order.

When the order data are accessed by the packing system, the packing system determines the best method for packing the articles. Factors affecting the best method for packing include, but are not limited to, packing costs for the order, labor costs for packing the order, delivery costs for shipping the order to the customer, protection measures required to prevent damage to the articles during shipping, regulatory requirements for shipping particular articles, and delivery due date for the order.

Based on the above order data, the packing system determines all of the possible packing configurations the order can be packed and shipped. Each packing configuration is assigned a delivery index. The optimal or preferred packing configuration has the highest delivery index. The packing system then generates instructions for packing the customer order in the preferred configuration. Optionally, the packing system generates instructions for packing the customer order in the configuration with the second highest delivery index.

In general, the first step in determining the preferred packing configuration is to separate the articles by regulatory requirements. Regulatory requirements are regulations imposed by governmental agencies or carriers for shipping particular articles. For example, when an article is required to be shipped in its own container, the article is segregated from the rest of the customer order and the best available box for packing and shipping the article is determined.

After the articles are segregated into groups based on regulatory requirements, the packing system determines the dimensions of the container needed to hold the articles for each group. The packing system determines the total dimensions of each group of articles with respect to how the articles are segregated. For example, when the order consists of two articles and one article must be shipped separately, the packing system knows it needs two containers to ship the articles. Then packing system determines which containers will hold the articles for each group.

The packing system starts by finding for each group, a container that at the time of packing the customer order will hold all of the articles in the group. To do this, the packing system determines the total dimensions of the articles in each group and for each group the packing system determines all of the containers that can hold the articles of that group. Next, the packing system determines the weight of each of the groups of articles. When the weight of any particular group of articles exceeds the weight allowed by a carrier or by the customer, the packing system will segregate the articles in the group into subgroups that do not exceed the allowable weight. For each subgroup, the packing system determines the total dimensions of each subgroup and for each subgroup determines all of the containers that can hold the articles of that subgroup. The packing system of the present invention is compatible with existing warehouse management and picking systems and does not depend on how the order is filled by these systems.

Based on the fragility of the articles in the customer's order, the packing program determines the packing material, e.g., paper or styrofoam peanuts, for packing the container packed with the articles. The packing system also determines the amount of packing material needed for the packed container based on the volume of the container less the volume of the articles in the container. In determining the packing material to be used, the packing system considers any packing material restrictions that may be imposed by the customer and eliminate packing materials that violate the customer's packing material restrictions. For example, a customer may request that the order not be packed with styrofoam peanuts in which case the order will be packed with paper or some other packing material acceptable to the customer. Next, the packing system determines whether the packing material selected is available in the user's inventory. When a particular packing material is not available or will not be available at the time of required shipment, then the packing system substitutes an alternative packing material.

After all of the possible containers for the customer order are determined and the packing material for each of the containers is determined, the packing system determines the cost for each of the possible packing configurations.

Next, the packing system determines the delivery options for each of the possible packing configurations. The delivery options are based on the due date requested by the customer and carrier restrictions on shipping such as weight and size of the shipment. The packing system determines which carriers can get the customer's order to the customer by the due date in view of the particular shipping requirements or restrictions of each of the carriers that can get the customer's order to the customer by the due date. For example, if a first carrier can deliver the customer order by the due date, but that carrier will only accept containers weighing less than 10 kilos, then possible packing configurations with weights greater than 10 kilos are eliminated from the possible packing configurations available for shipment by that carrier. However, packing configurations with weights greater than 10 kilos are not eliminated for carriers that accept containers over 10 kilos. Included in the determination of delivery options is the cost of delivery charged by each carrier for shipping each of the possible packing configurations acceptable to the carrier.

Next, based on the packing material used and the carrier requirements, the labor cost for packing each of the possible packing configurations is determined.

Finally, the packing system determines the final cost for each of the possible packing configurations based upon packing material costs, packing labor costs, and delivery costs. The packing system selects the preferred packing configuration with the lowest cost and optionally, the packing configuration with the next lowest cost. The packing system generates instructions for the preferred packing configuration, which in a preferred embodiment are presented to a packer who manually packs the container according to the packing instructions.

In the preferred embodiment, the packing system uses World Wide Web interface technology to take the data for each customer order and for the preferred packing configuration for that order, draw the container and articles representing the packing instructions. The packing instructions can be viewed on a computer screen or printed on paper. To enable the articles to be identified, the packing system uses visual aides to identify the container, the packing material, and the articles, including their characteristics. For example, a first article may be drawn in blue and a second article may be drawn in be red. Fragile articles may be drawn with an orange border and durable articles may be drawn with a black border. In a particular embodiment, an article is shown as an image of either the article or the package containing the article. In another embodiment, an article is shown as a stylized representation of the article, as a symbol to represent the type or class of which the article is a member, or in colors that represents the colors of the article or the package containing the article. When a printed packing configuration is included with the order shipped to the customer, it facilitates the customer's ability to repack the order for return in the event the customer is unsatisfied with the order.

In one embodiment, the packing of the container is shown in animation. The articles are shown being packed in the preferred packing configuration. For example, the articles and packing material are drawn outside the container. Then either by the packer activating the animation or automatically after allowing the packer to comprehend the order, the articles are packed in the container in the sequence that enables the container to be packed in the preferred configuration. In a multiple container order, when the first container is packed, it moves to the side of the screen and the next container is packed as above. After all containers are packed, the packed containers move to the primary screen in the order they are to be packed. The packing system also displays written instructions of how to pack the container.

The packing system is able to use the following computer hardware: a network server running WINDOWS, WINDOWS NT, UNIX, Linex, or other operating system; a client side computer with at least a 200 mhz processor, at least 500 megabyte hard-drive, and, at least 64 megabyte of random access memory (RAM) at each workstation; and, a client side computer with the same requirements as the above client side machine to be available for administrative tasks and data entry. WINDOWS is a trademark of Microsoft Corporation, Redmond, Washington. None of the above need to be computer dedicated to the packing system. It is understood that the packing system is not limited to the above hardware. Changes in computer hardware performance and availability and the addition of other features to the packing system that require changes in computer hardware performance are within the scope of the packing system.

FIG. 1 shows the technology infrastructure of the packing system 10 of the present invention. The packing system of the present invention is designed to interface with the supplier's legacy or current order entry system 12 using an XML converter 14 which serves as a bridge to data stored in SQL database 16, which by using XML for data portability 18 and Java-based functionality 19 produces an XML output to a visual system 21. In particular embodiments, this interface is customized for each user. In other embodiments, the user will construct this interface as it configures the packing system. Using current computer technology, the interface is constructed in C++, Visual Basic, or Java and the data output is formatted in XML for easy portability across a plurality of computer applications and operating systems.

Because of the interface with the legacy system, data flows from the legacy system database to the packing system with no programming or data entry intervention required. The packing system takes the data and processes it to create the optimal packing configuration for the user. The preferred database is any ODBC or JODBC compatible database which includes such databases as an SQL database or a Microsoft ACCESS database. The user interface is based on browser technology, which includes, but is not limited to, Java, hypertext markup language (HTML), customer graphical interface (CGI), visual basic, and other technologies used to create Web-based user interfaces.

The output of the packing system is an XML formatted data file that can easily interface with the legacy system or other systems including, but not limited to, accounting systems, order entry systems, and enterprise resources planning/manufacturing resources planning (ERP/MRP) systems. The output includes, but is not limited to, reporting of packing material usage, delivery frequencies per vendor and type, and suggestions for new packing and delivery methods.

Figure 2:
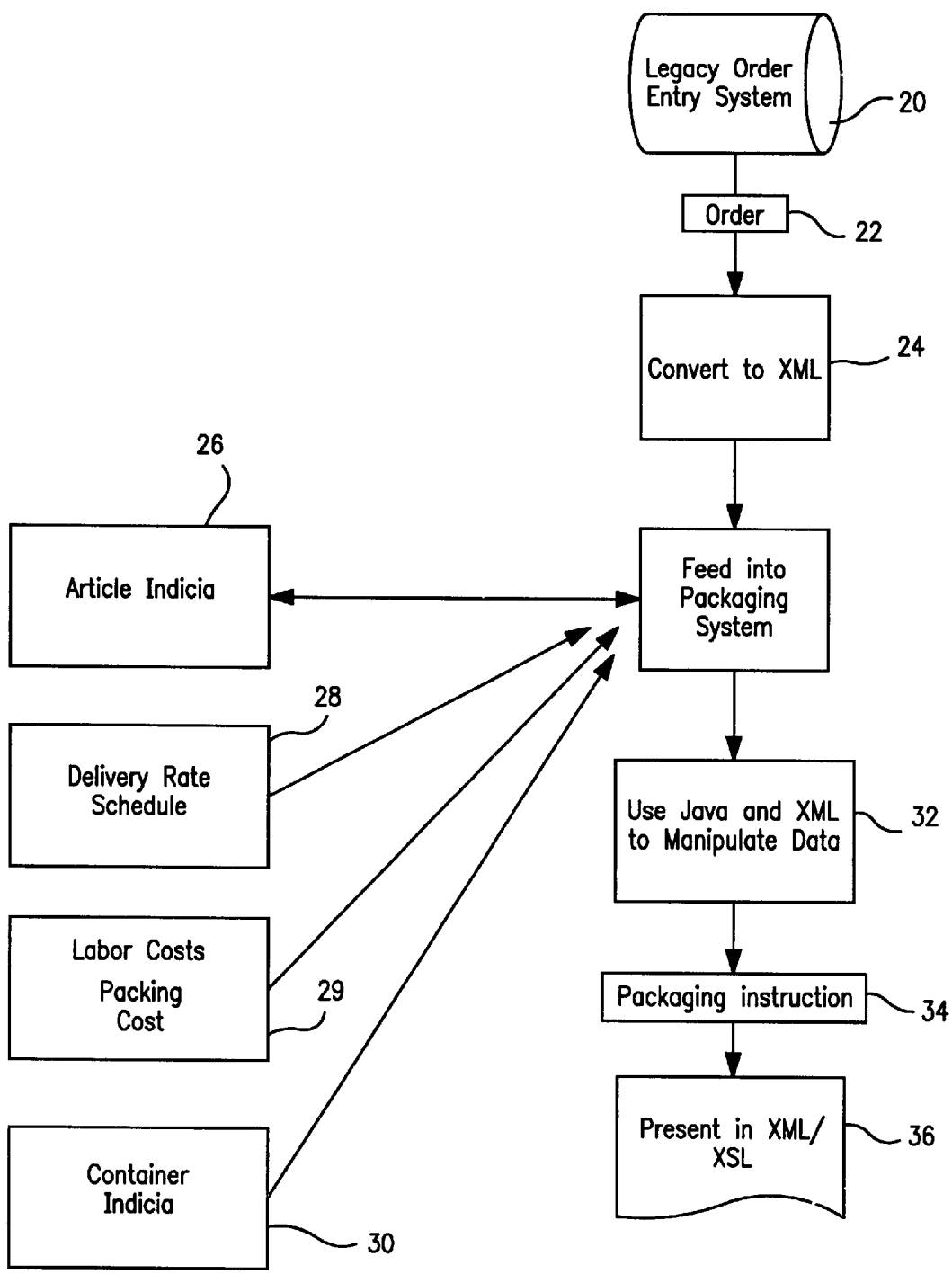
FIG. 2 is a schematic drawing showing the overall technology flow of the system of the present invention.

The general technology flow through the packing system of the present invention is shown in FIG. 2. A customer order for one or more articles is received by the user of the packing system and identifiers for each of the articles in the customer order are entered into an order entry system 20. Special shipping instructions requested by the customer are also entered into the order entry system 20. In general, order entry systems are referred to in the art as a legacy system. The customer order 22 is then converted into XML using an XML converter program 24, which enables the order to be translated into computer program code readable by the packing system.

In response to the identifiers for the articles in the customer order 22, the packing system retrieves from an SQL database 26, which is stored in the memory of a programmable computer, indicia corresponding to the articles in the order. The packing system also retrieves from a second SQL database 28 indicia consisting of delivery and rate schedules for a plurality of carriers, and labor and packing material costs from a third database 29. The packing system further retrieves from a fourth SQL database 30 indicia for one or more containers for packing the articles in the customer order. The retrieved indicia from the SQL databases are translated into program code readable by the packing system.

Next, the retrieved indicia corresponding to the articles in the customer order are processed using Java and XML program codes 32 to generate a plurality of possible packing configurations for shipping the order. The packing system then selects the preferred packing configuration and generates packing instructions 34. Optionally, the packing system generates packing instructions for a second or alternative preferred packing configuration. The packing instructions 34 are presented in XML or XSL program code 36, which is then used to provide the instructions for packing the particular container of the preferred packing configuration.

Figure 4:
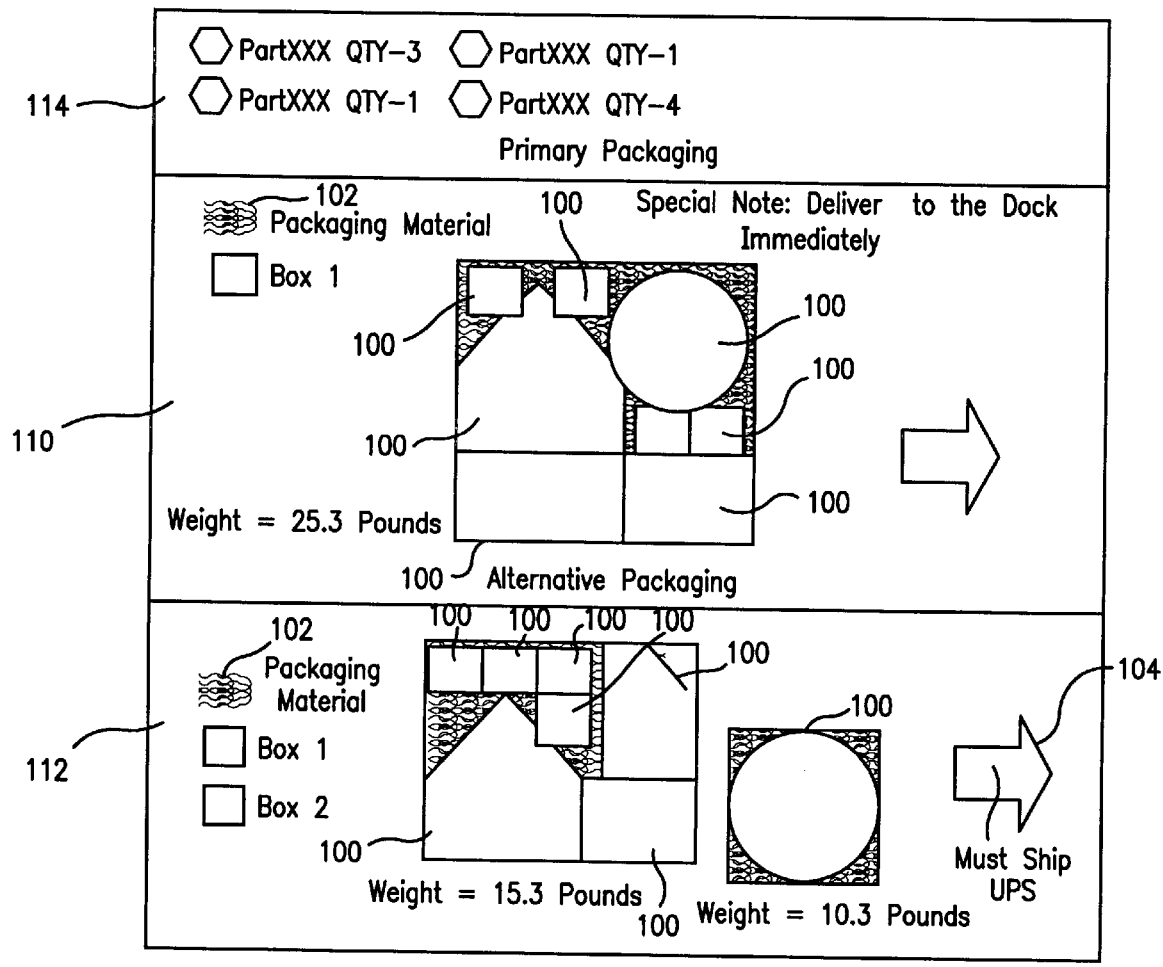
FIG. 4 is a schematic drawing showing a graphic display of the instructions indicating the preferred and alternative packing configurations.

The packing instructions 34 can be used to direct packing by an automatic packing apparatus (not shown). However, in a preferred embodiment, the packing instructions 34 are converted into a visual representation of the preferred packing configuration and written instructions for the preferred packing configuration, and the packing is then performed manually. The visual representation and written instructions can be graphically displayed on an LCD, CRT, or PD screen of a computer terminal or other display device, or printed on paper to produce a hard copy of the packing instructions. A hard copy of the packing instructions can be included with the order that is shipped to the customer to provide guidance to the customer for repacking the order in the event the customer wants to return the order. FIG. 4 shows a computer screen showing a visual representation of the preferred packing configuration and an alternative or second preferred packing configuration.

Figure 3:
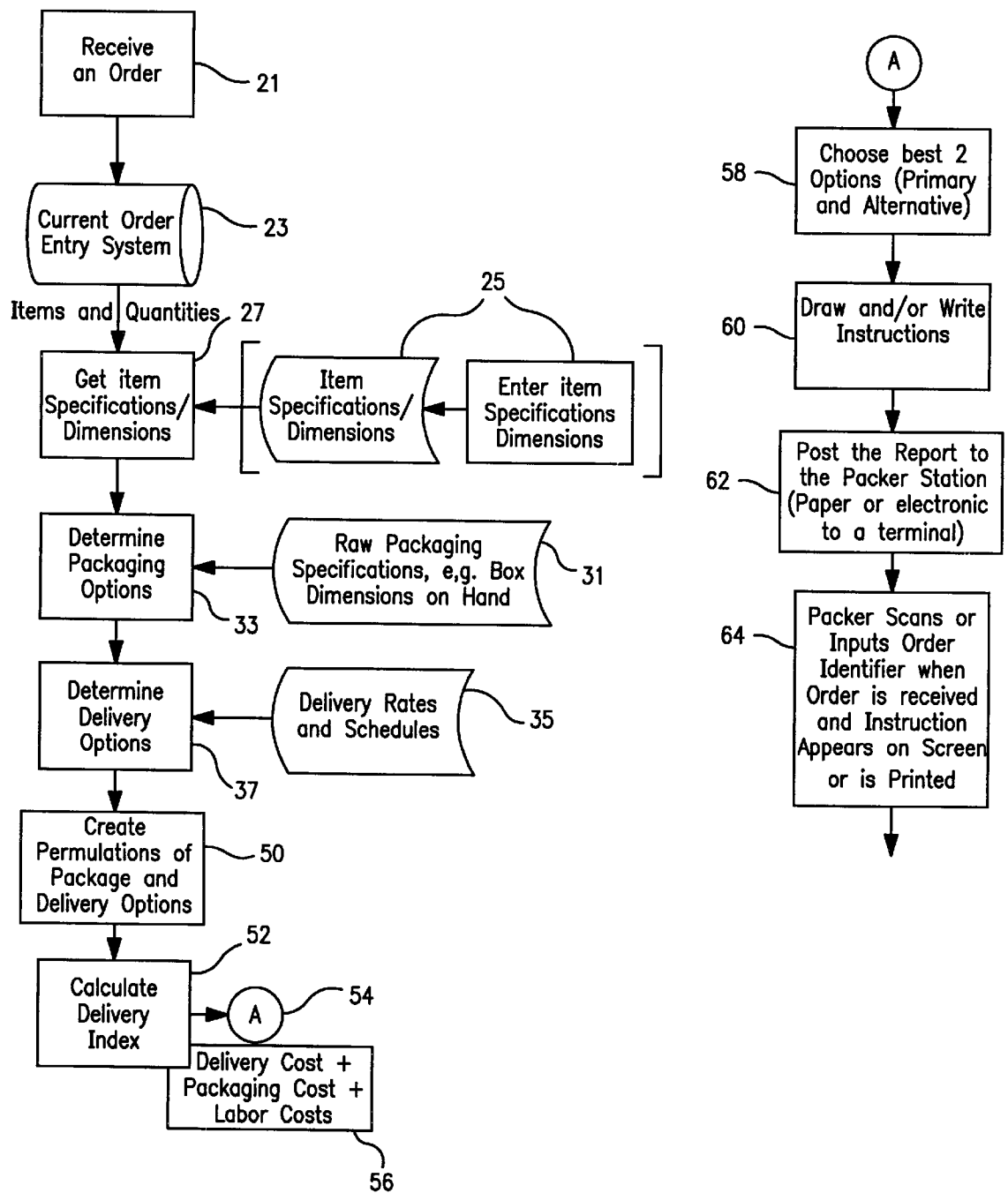
FIG. 3 is a schematic drawing showing the general flow of information through the system of the present invention.

FIG. 3 shows the flow of information through the packing system of the present invention. An order 21 for one or more articles is received from a customer and entered into the current order entry system 23. Also entered into the order entry system 23 are special shipping instructions requested by the customer. The packing system then retrieves the order from the order entry system 23 and retrieves the indicia 27 corresponding to each article in the order 21 from the article database 25 stored in the memory of a programmable computer. Then, based on the indicia 27 for the articles and the special shipping instructions requested by the customer, the packing system determines whether particular articles can be packed together in a particular container. Based on the indicia for the articles, the packing system sorts the articles into groups of articles, each group to be packed in a separate container. Therefore, the number of groups of articles determines the number of containers that are needed to pack the articles.

For each group of articles, the packing system retrieves the indicia for one or more containers from a container database 31 stored in the memory of a programmable computer. Then, the packing system generates a plurality of possible packing configurations 33 based upon the indicia 27 for each of the articles in the group of articles and indicia for each of the containers. The packing system then selects a preferred packing configuration for each of the groups of articles and optionally an alternative or second packing configuration for each of the groups of articles. The packing system then provides packing instructions for packing the articles in each group in the preferred configuration in the preferred container.

In general, the preferred packing configuration is a "loose fit" configuration that takes into account that the articles are packed in the container in packing material to protect the articles during shipping. Therefore, it is preferable that the indicia for each article include the volume occupied by the packing material that is used to wrap or surround the article.

FIG. 3 also shows the preferred step of determining delivery options 37 generating a plurality of packing configurations 50 further based upon the delivery options available for each of the plurality of packing configurations stored in database 35. The delivery options include delivery schedules and rates indicia in a delivery schedule and rate database 35, stored in the memory of a programmable computer. The above plurality of packing configurations are then processed 50 in view of the delivery rate and schedule indicia to generate a delivery index 52 for each of the plurality of packing configurations. Next, a final delivery index 54 is determined by processing the delivery index 52 in view of the packing costs and labor costs 56 for each of the plurality of packing configurations. The packing costs and labor costs are stored in a packing and labor costs database 29 stored in the memory of a programmable computer. Based on the delivery indices for the plurality of packing configurations, the packing system selects the preferred packing configuration 58 and optionally, the alternative or second preferred packing configuration. Packing instructions 60 are then provided for packing the articles. Therefore, the preferred packing configuration is that configuration which allows for the most efficient packing arrangement in the most suitable container in view of carrier schedules and rates for that container, and the costs of labor and materials to pack that container.

FIG. 3 also shows the preferred embodiment wherein a visual representation and written instructions are provided to a packing area or station 62. The visual representation and written instructions can be provided graphically in an electronic format displayed on an LCD, CRT, or PD screen to a display device or computer or printed on paper. Generally, the packer will also receive a copy of the customer's order, which has an order tracking number or purchase order number. The packer then inputs the order tracking number or purchase order number by typing it, speaking it, or scanning it into a computer terminal, portable computer, or other input device used by the packer in the packing area that is operably connected by wires, cables, or radio frequency waves to packing system 64. The preferred packing configuration and the written instructions for the inputted order are then transmitted to a computer or display device accessed by the packer and graphically displayed on an LCD, CRT, or PD screen to the computer or display device, or to a printer accessed by the packer and printed on paper, or both. The packer then packs the container according to the instructions. Optionally, the packer includes with the packed order a printed copy of the preferred packing configuration to be used by the customer for repacking the order in the event the customer wants to return the order.

FIG. 4 shows an example of the graphic or visual representation and written instructions for a preferred packing configuration 110 and an alternative or second preferred packing configuration 112. As shown in FIG. 4, the articles 100 are identifiable by shape and by color or shading when the articles 100 have similar shapes. The visual display also lists each of the articles and the number of each article to be packed 114, shows the packing material 102 to be used for packing the container, and specifies the carrier to use for shipping the order 104. While the articles in the image can be distinguished from each other by shape and different colors or shading, the articles can also be distinguished from each other by using images that have the name or identifier for each article superimposed on the image for that article. Thus, each article in the visual representation can include a numerical or textual identification of the article displayed on the article. Alternatively, the image for each article reproduces the actual appearance of the article.

In a preferred embodiment, the visual representation provides a side view image of the packed container, a front view image of the packed container, a back view of the packed container, and a top view image of the packed container. In more preferred embodiment, the visual display provides a three-dimensional image of the packed container that is rotatable along any one of the three-dimensional axes, X, Y, and Z. In a most preferred embodiment, the visual representation can be in the form of an animated motion picture that shows the articles being packed into the container.

Figure 5:
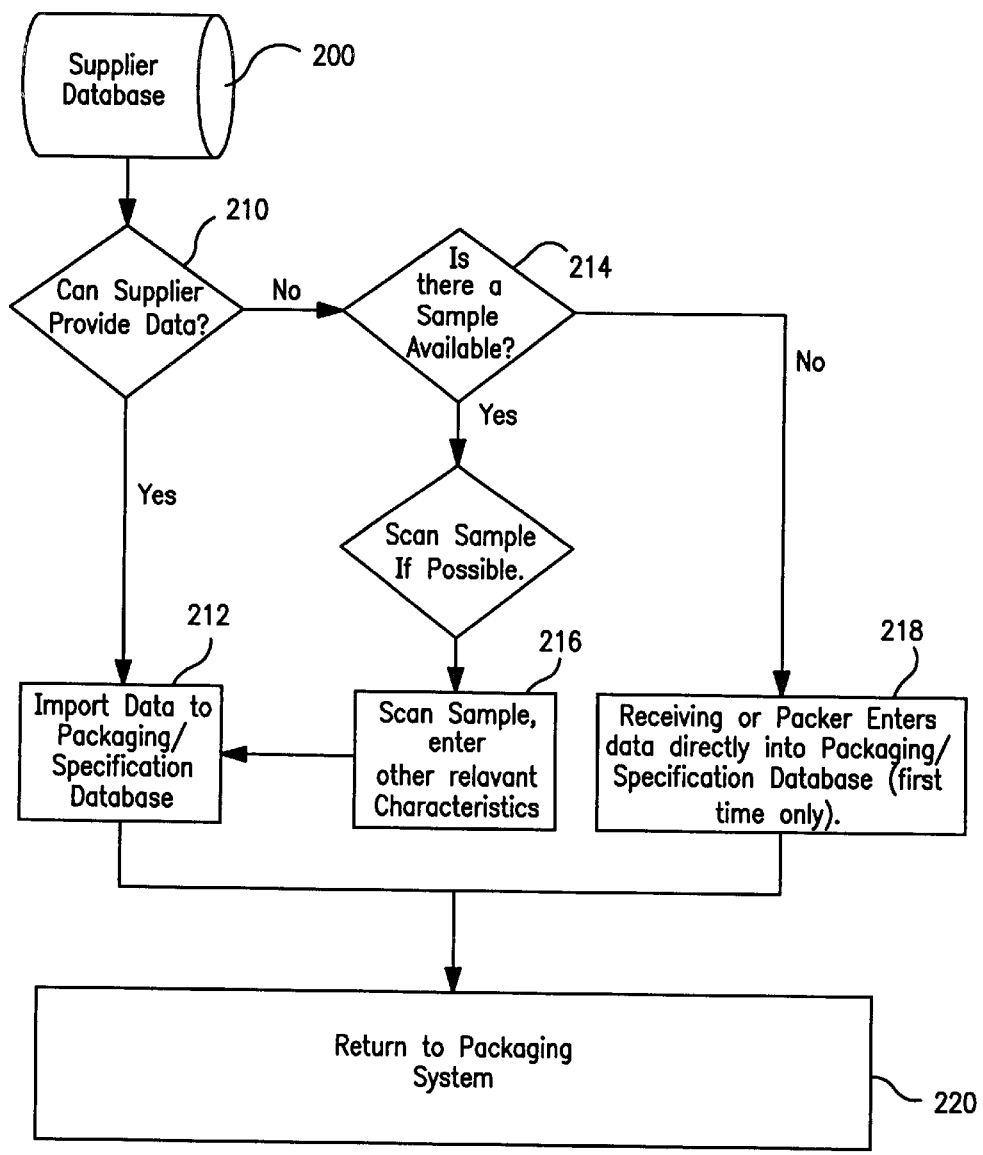
FIG. 5 is a schematic drawing showing a flowchart for entering article indicia into the article database.

FIG. 5 shows a flow diagram for inputting indicia for an article into the article database for access by the packing system of the present invention. If the supplier can provide the indicia 210, the indicia can be obtained from the article's supplier's database 200 stored in the memory of the supplier's programmable computer. The article's indicia is imported 212 into the article database that is stored in the memory of a programmable computer that is accessible by the packing system. If the supplier cannot supply the indicia for an article 210, there are at least two options for inputting the indicia into the article database. In the first option 214, if a sample article is available, its indicia can be inputted 216 directly into the article database. In the second option 218, when a sample article is not available, the packer inputs the indicia for the article directly into the database when the packer receives the article for packing. The indicia are now available for access by the packing system 220.

Figure 6:
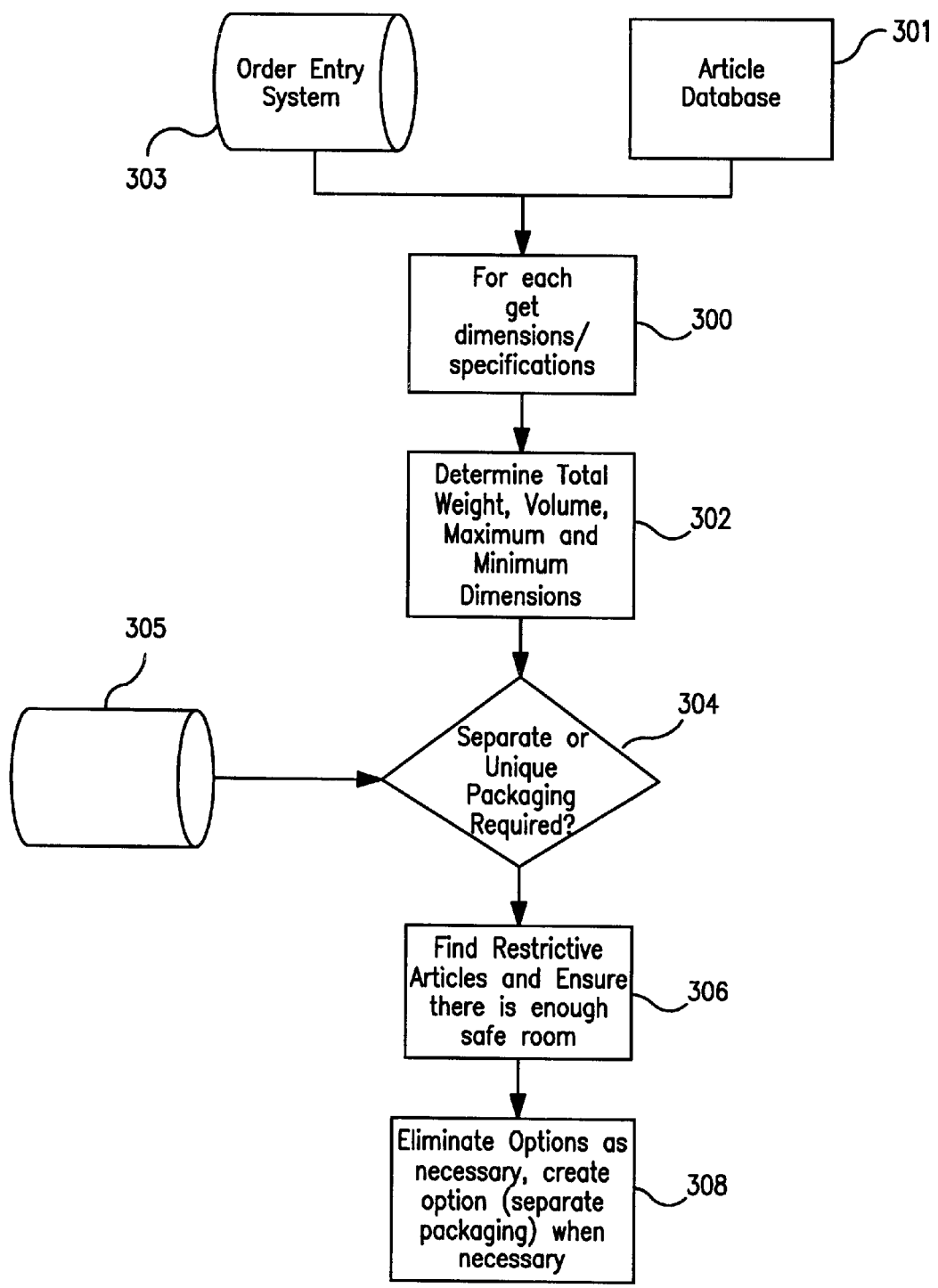
FIG. 6 is a schematic drawing showing a flowchart for obtaining indicia for all articles in a customer order and determining the preferred packing configuration.

FIG. 6 shows an example of a packing system hierarchy for determining packing options according to the packing system of the present invention. The packing system obtains from the article database 301 the indicia 300 for each article of a customer order entered into the order entry system 303. Next, the packing system determines the total weight, volume, and maximum and minimum dimensions of the packed articles for the customer order 302. The packing system then decides whether the articles in the order should be shipped in the same container, shipped in two or more containers, or shipped in one or more special containers 304. To make these decisions, the packing system obtains from the article database 305 restrictions, limitations, and rules for each of the articles. The packing system then determines the packing configurations based on the restrictions, limitations, and rules 306, eliminating packing configurations based on these restrictions, limitations, and rules 308. When the packing system determines a customer order is to be shipped in two or more containers, the packing system sorts the articles into groups, each group consisting of those articles that the packing system has determined can be shipped in the same container. The packing system then determines the total weight, volume, and maximum and minimum dimensions of the packed articles for each of the groups 308. Finally, as described previously, the packing system determines the preferred packing configuration for each of the groups. Thus, the packing system determines packing configurations that do not violate the restrictions, limitations, and rules for any particular article in the order.

Restrictions include indicia concerning special shipping conditions for each article, limitations include indicia concerning how each article can be packed and the relationship each article in the order has to every other article in the order, and rules include indicia concerning whether the order consists of any articles of a type that cannot or should not be shipped with any other article in the order.

An example of a restriction for an article is that an article that is a frozen food should be shipped in an insulated container that prevents the frozen food from thawing during shipping. For example, an article such as a frozen steak is generally shipped in a styrofoam container containing dry ice which is then shipped by air express with the proper declaration that the shipment contains dry ice.

An example of a limitation for an article is that an article that is fragile or crushable should not be packed in the same container with an article heavy enough to damage the fragile article. Separately packing fragile or crushable articles prevents damage to the fragile or crushable article during packing or shipment. Thus, an article such as a dried floral arrangement should not be packed in a container with an article such as a bowling ball, which can crush the floral arrangement.

An example of a rule for an article is that an article that can contaminate another article that is susceptible to the contamination should not be packed in a container with the susceptible article. Thus, an article that emits a scented odor such as perfumed soap, should not be packed in a container with an article that can readily absorb the scented odor such as chocolates.

Other examples of restrictions, limitations, and rules would be readily evident to those skilled in the art of packing and shipping.

Figure 7:
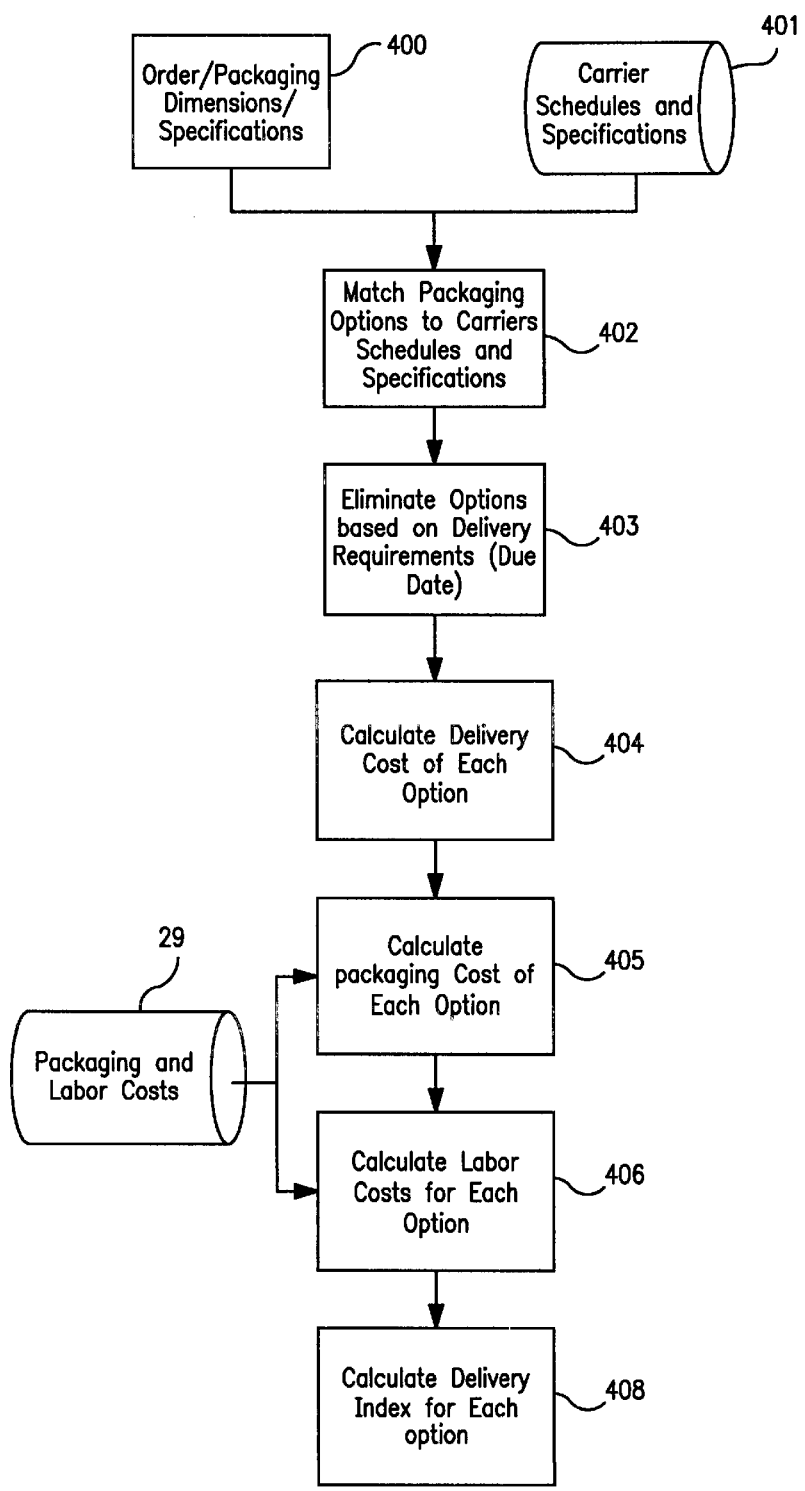
FIG. 7 is a schematic drawing showing a flowchart for determining delivery options.

FIG. 7 shows a packing system hierarchy according to the packing system of the present invention for determining the preferred packing configuration that is further based on the delivery options for each of the plurality of packing options. Each of the plurality of packing configurations is matched to the carrier schedules and delivery rates corresponding to each of the packing configurations and which are obtained from delivery schedule and delivery rate database 401 stored in the memory of a programmable computer.

The schedule delivery rates are based upon indicia that includes, but is not limited to, the dimension of the packed container, weight of the packed container, and carrier shipping schedules of a plurality of carriers for each of the dimensions and weights. The delivery rate indicia includes, but is not limited to, the rate the carrier charges for a particular destination based upon the dimension and weight of the packed container. First, the packing system 10 matches the packing configurations to carrier schedules and specifications 400 using the indicia from the carrier schedule and rate database 28. Next, the packing system 10 eliminates those packing configurations that have a delivery schedule that cannot meet a due date for customer order 403. Then the packing system determines the delivery cost for the remaining packing configurations 404. Next, the packing system determines the packing costs for the remaining packing configurations 405 and then the labor costs for each configuration 406. The packing costs include labor costs and packing material costs obtained from a packing and labor cost database 29 stored in the memory of a computer. Finally, the packing system 10 determines a delivery index 408 for each packing configuration and selects the packing configuration with the most preferred delivery index (not shown). Optionally, the packing system determines an alternative or second preferred packing configuration.

Figure 8:
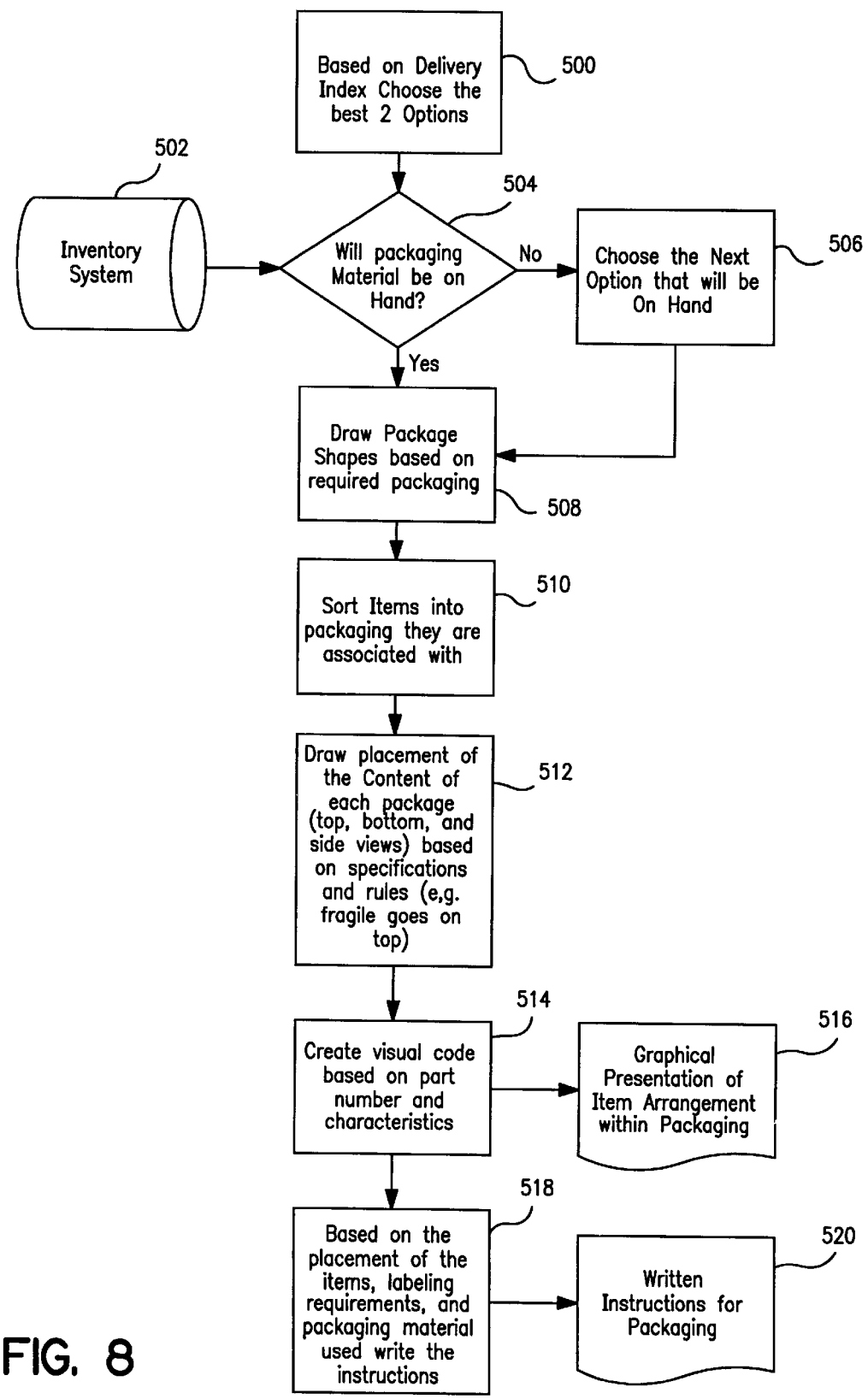
FIG. 8 is a schematic drawing showing a flowchart for drawing and writing packing instructions.

FIG. 8 shows a packing system hierarchy for drawing and writing packing instructions according to the packing system of the present invention. Based on the delivery index for the possible packing configurations, the packing system selects the preferred packing configuration and optionally a second preferred packing configuration 500. The packing system consults an inventory database 502 stored in the memory of a programmable computer for the availability of packing material most suitable for packing the articles in the preferred packing configuration or in the alternative or second preferred packing configuration 504. If the most suitable packing material is not in inventory, then the packing system queries the database 502 for a suitable alternative packing material 506.

Once a suitable packing material has been found, the packing system draws shapes to represent the articles comprising the customer's order taking into account the available packing material 508. The packing system then sorts the articles into the preferred container or containers 510 and draws the articles in the preferred container or containers according to the packing restrictions, limitations, and rules determined for each of the articles 512. Then, a visual code is generated for the packing instructions 514, which is a graphical representation of the packed container 516, and based on the placement of the articles in the preferred container, labeling requirements for the container, and packing material generate 518 written instructions 520. In general, the packing instructions are in a java-based code.

Figure 9:
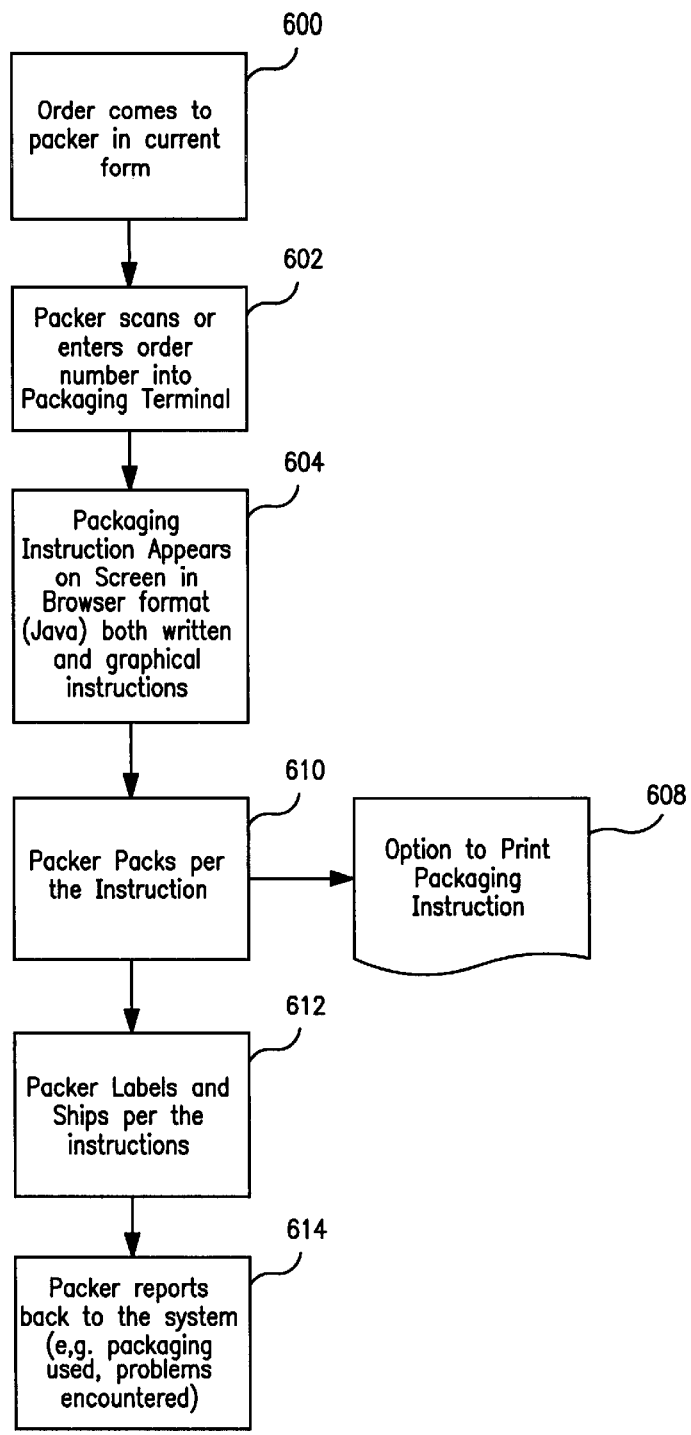
FIG. 9 is a schematic drawing showing a flowchart for packing a container.

FIG. 9 shows a packing system hierarchy for manual packing according to the system of the present invention. The customer order 600 is received by the packer who then scans or enters the order identifier into a computer in the packing area 602. The packing instructions appear on an LCD, CRT, or PD screen to a computer terminal or display device 604. Preferably, the packing instructions provide both a visual representation of the packing configuration and written instructions. Optionally, the packing instructions are printed on paper 608. The packer then packs the container according to the packing instructions 610, labels the container according to the packing instructions, and ships the packed container according to the packing instructions 612. Afterwards, the packer can enter feedback information into the packing system consisting of the packing material that was used to pack the order and information concerning problems that were encountered during packing 614. This feedback information is stored in a database in a programmed computer and is accessed by the packing system when an order similar to the packed order is subsequently entered into the packing system. Thus, the packing system adds intelligence back into the packing system.

EXAMPLE 1

This example illustrates the operation of the method of the present invention using the computer program provided on the CD entitled "010427_1148". The file disclosing the computer program is entitled "PackagingSolutions" (PACKAG~6.TXT) and was created Apr. 27, 2001.

"PackagingSolutions" (PACKAG~6.TXT) comprises the following computer program codes and files: (1) Table:1da, created Dec. 18, 2000, (2) Table: tblCarrierSchedules, created Dec. 8, 2000, (3) Table; tblCompanies, created Jul. 8, 2000, (4) Table: tblDimensionalData, created Jul. 8, 2000, (5) Table: tblFill, created Dec. 8, 2000, (6) Table; tblFragility, created Dec. 8, 2000, (7) Table: tblImages, created Oct. 22, 2000, (8) Table: tblIndustries, created Jul. 8, 2000, (9) Table: tblJournal, created Jul. 8, 2000, (10) Table: tblPackagingData, created Dec. 8, 2000, (11) Table: tblPackagingUsed, created Dec. 8, 2000, (12) Table: tblPairedData, created Feb. 1, 2001, (13) Table: tblPartInformation, created Jul. 8, 2000, (14) Table: tblPeople, created Jul. 8, 2000, (15) Table: tblPicturesAuditQuestion, created Feb. 1, 2001, (16) Table: tblPicturewithAudits, created Feb. 1, 2001, (17) Table: tblProductionOrderHeader, created Oct. 25, 2000, (18) Table: tblProductionOrderLine, created Oct. 25, 2000, (19) Table: Separations, created Dec. 8, 2000, (20) Table: tblShapes, created Dec. 8, 2000, (21) Table: tblTypeCompanies, created Dec. 8, 2000, (22) Table: tblTypeImages, created Oct. 22, 2000, (23) Table: tblTypesPartStatus, created Oct. 22, 2000, (24) Query: qurBoxOrderData, created Feb. 8, 2001, (25) Query: qurCalculateDimWeightGirth, created Dec. 21, 2000, (26) Query: qurCarrierMax, created Dec. 8, 2000, (27) Query: qurChooseBoxes, created Feb. 8, 2001, (28) Query: qurChooseBoxGirth, created Feb. 8, 2001, (29) Query: qurChooseBoxGirthandDimW, created Feb. 28, 2001, (30) Query: qurGetDimensions, created Dec. 8, 2000, (31) Query: qurGetgroupDetailedDimensions, created Dec. 21, 2000, (32) Query: qurGetgroupSummaryDimensions, created Dec. 21, 2000, (33) Query: qurGetPossibleBoxes, created Dec. 21, 2000, (34) Query: qurGetPossibleBoxGirthDimweights, created Dec. 21, 2000, (35) Query: qurgetweights, created Dec. 8, 2000, (36) Query: qurorderDetail, created Dec. 21, 2000 , (37) Query: qurorderDimensions, created Dec. 8, 2000, (38) Query: qurPackagingUsedDetail, created Dec. 8, 2000, (39) Query: qurPackagingUsed Summary, created Dec. 8, 2000, (40) Query: queSeparateorder, created Dec. 8, 2000, (41) Query: qurWeighGroups, created Dec. 8, 2000, (42) Form: 000temp, created Aug. 8, 2000, (43) Form: frmAddImage, created Oct. 22, 2000, (44) Form: frmAdministration, created Oct. 22, 2000(45) Form: frmCariers, created Dec. 8, 2000, (46) Form: frmCharacteristics, created Dec. 8, 2000, (47) Form: frmCustomers, created Oct. 25, 2000, (48) Form: frmDefinePartStatus, created Oct. 22, 2000, (49) Form: frmDefineTypesImages, created Oct. 22, 2000, (50) Form: frmEnterAnOrder, created Oct. 25, 2000, (51) Form: frmFill, created Dec. 8, 2000, (52) Form: frmFragility, created Dec. 8, 2000, (53) Form: frmGetPictureName, created Feb. 1, 2001, (54) Form: frmHome, created Aug. 3, 2000, (55) Form: frmKaizen, created Oct. 25, 2000, (56) Form: frmListorders, created Oct. 17, 2000, (57) Form: frmpackagingData, created Oct. 25, 2000, (58) Form: frmPackImage1, created Feb. 8, 2001, (59) Form: frmPictureManagement, created Feb. 1, 2001, (60) Form: frmPicturesAuditReport, created Feb. 1, 2001, (61) Form: frmPicturewithAuditQuestions, created Feb. 1, 2001, (62) Form: frmPrintLabels, created Oct. 25, 2000, (63) Form: frmProcessWalkThrough, created Feb. 8, 2001, (64) Form: frmReports, created Oct. 25, 2000, (65) Form: SelectOrder, created Oct. 17, 2000, (66) Form: frmSeparations, created Dec. 8, 2000, (67) Form: frmShapes, created Dec. 8, 2000, (68) Form: frmUser, created Oct. 17, 2000, (69) Form: frmVendors, created Dec. 8, 2000, (70) Form: frnparts, created Aug. 3, 2000, (71) Form: MsysCompactError subform, created Feb. 8, 2001, (72) Form: qurBoxOrderData subform, created Feb. 8, 2001, (73) Form: qurCalculateDimWeightGirth subform, created Feb. 8, 2001, (74) Form: qurChooseBoxes subform, created Feb. 8, 2001, (75) Form: tblCarrierSchedules subform, created Dec. 8, 2000, (76) Form: tblCharSpecs subform, created Aug. 3, 2000, (77) Form: tblDimensionalData subform, created Dec. 8, 2000, (78) Form: tblFragility, created Feb. 8, 2001, (79) Form: tblproductionOrderLine subform, created Oct. 25, 2000, (80) Form: tblproductionOrderLine subform, created Feb. 9, 2001, (81) Report: qurGetWeights, created Dec. 8, 2000, (82) Report: qurpartDimensions, created Oct. 25, 2000, (83) Report: qurSeparateOrder, created Dec. 8, 2000, (84) Macro: mcrMaximize, created Oct. 17, 2000, (85) Macro: mcrRemovePictures, created Feb. 8, 2001, (86) Database: \\Raven\ravensn\PS\oppack.mbd, (87) Relationships, (88) Table: ImageHTML, created Apr. 9, 2001, (89) Table: tblHTMLData, created Feb. 21, 2001, (90) TableHTMLDataImages, created Mar. 3, 2001, (91) Table: tblHTMLDataStraightPage, created Feb. 21, 2001, (92) Table: tblOrderBoxesImages, created Apr. 23, 2001, (93) Table: tempOrderDetailStretch, created Apr. 9, 2001, (94) Table: tempOrderItems, created Apr. 9, 2001, (95) Query: GetCarriers, created Mar. 3, 2001, (96) Query: Maketableformat, created Apr. 9, 2001, (97) Query: qurAddHTMLBottom, created Apr. 20, 2001, (98) Query: qurAddImageBox, created Apr. 23, 2001, (99) Query: qurAddImageHTML, created Apr. 20, 2001, (100) Query: qurFilestoCopy, created Apr. 20, 2001, (101) Query: qurHTMLOnly, created Feb. 21, 2001, (102) Query: qurHTMLOnly2, created Apr. 20, 2001, (103) Query: qurHTMLVariable, created Feb. 21, 2001, (104) From: frmMakeImageHTML, created Apr. 9, 2001, (105) Form: qurContainers, created Apr. 20, 2001, (106) Form: tblOrderPositionTemp, created Apr. 9, 2001, (107) Form: tempOrderDetail subform, created Apr. 9, 2001, (108) Form: tempOrderDetailStretch, created Apr. 9, 2001, (109) Form: tempOrderDetailStretch1, created Apr. 9, 2001, (110) Form: tempOrderItems, created Apr. 9, 2001, (111) Table: tblQTYs, created Apr. 25, 2001, and (112) Query: qurDoNotUse, created Apr. 27, 2001.

For optimal operation of the program, an internet web browser such as Microsoft INTERNET EXPLORER 5.0 or higher and an image software such as Microsoft IMAGE COMPOSER are to be available to the user. Both are distributed by Microsoft with its WINDOWS software.

While the above computer programs and files can be used to practice the method and system of the present invention, the method and system of the present invention is not limited solely to the above computer programs and files. The above computer program and files is an example of one embodiment for performing the method and system of the present invention. The method and system of the present invention can be practiced with any computer program and files that allows the user to perform the method and system of the present invention in substantially the manner as disclosed herein.

EXAMPLE 2

This example shows the sequence of computer screen displays that are presented to the user during operation of the method and system of the present invention using the computer program and files set forth in Example 1.

Figure 10:
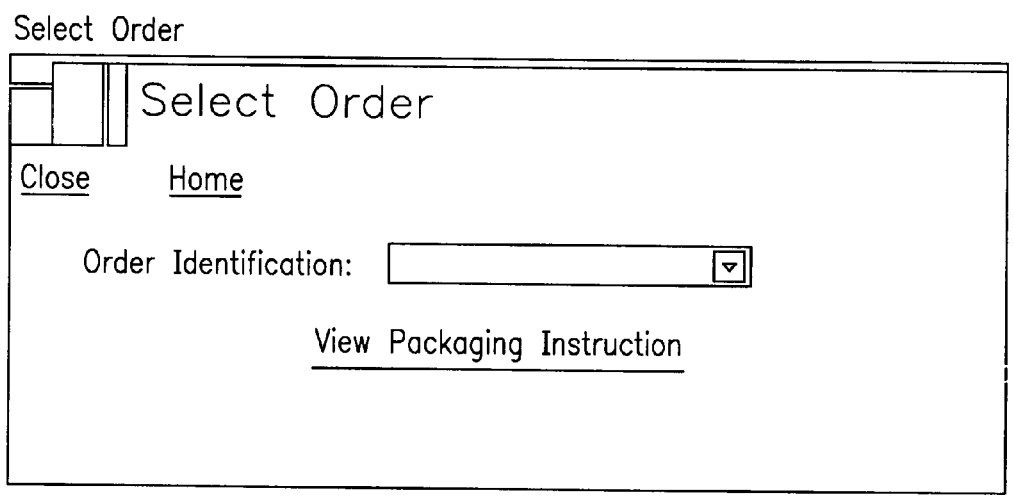
FIG. 10 shows the initial screen display that the user interfaces with upon entering the system of the present invention.

FIG. 10 shows the initial screen display that the user interfaces with upon entering the system of the present invention. The user selects a customer order by typing the order identification and then selects "View Packaging Instruction." The instructions that follow walks the user through the method.

Figure 11:
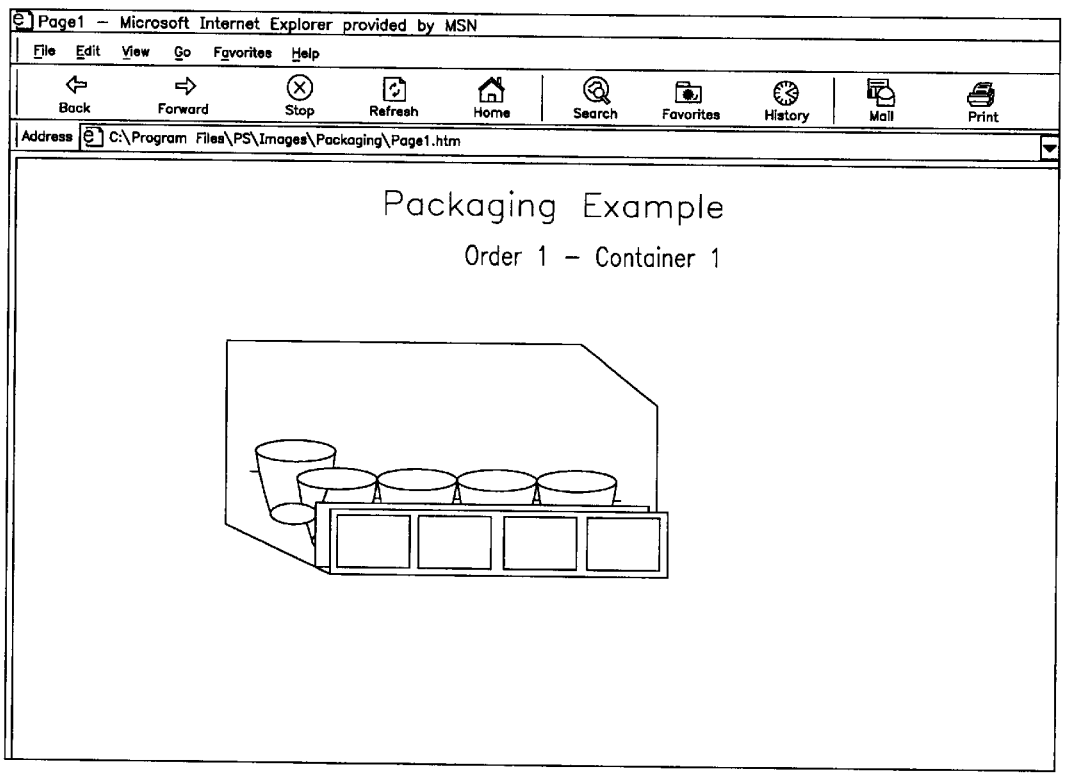
FIG. 11 shows a screen display of a visualization tool which is an example of the instruction the user uses as a guide.

FIG. 11 shows a screen display of a visualization tool which is an example of the instruction the user uses as a guide. The figure shows a packaging example for order 1, container 1, with articles arranged in the packing container.

Figure 12:
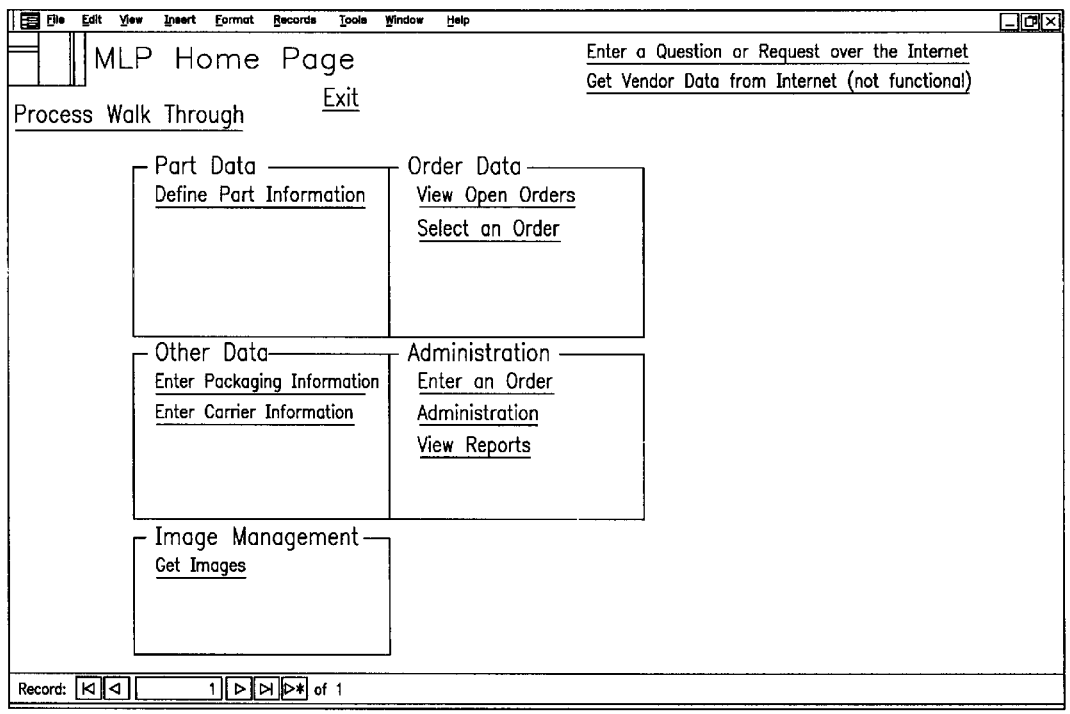
FIG. 12 shows a screen display of the packaging system home page.

FIG. 12 shows a screen display of the packaging system home page. The primary use of the home page is to allow administrative functions to be performed. For testing or demonstration purposes, this screen display provides the user the ability to define articles, containers, and order. However, in a fully functional and implemented system, this data comes from the user's existing order entry system. As shown in the screen display, the user can select "Define Part Information" under the heading "Part Data" which enables particular information relating to an article to be entered. Under the heading "Order Data" the user can select "View Open Orders" which enables the user to see an interactive list of all orders in the system or the user can select "Select an Order" which allows the user to select a particular order. Under the heading "Other Data" the user can select "Enter Packaging Information" which allows the user to enter packaging information or the user can select "Enter Carrier Information" which allows the user to enter carrier information. Under the heading "Administration" the user can select the administrative functions "Enter an Order", "Administrative", or "View Reports". Under the heading "Image Management" the user can select "Get Images". Or for testing and demonstration purposes, the user can select "Process Walk Through".

Figure 14:
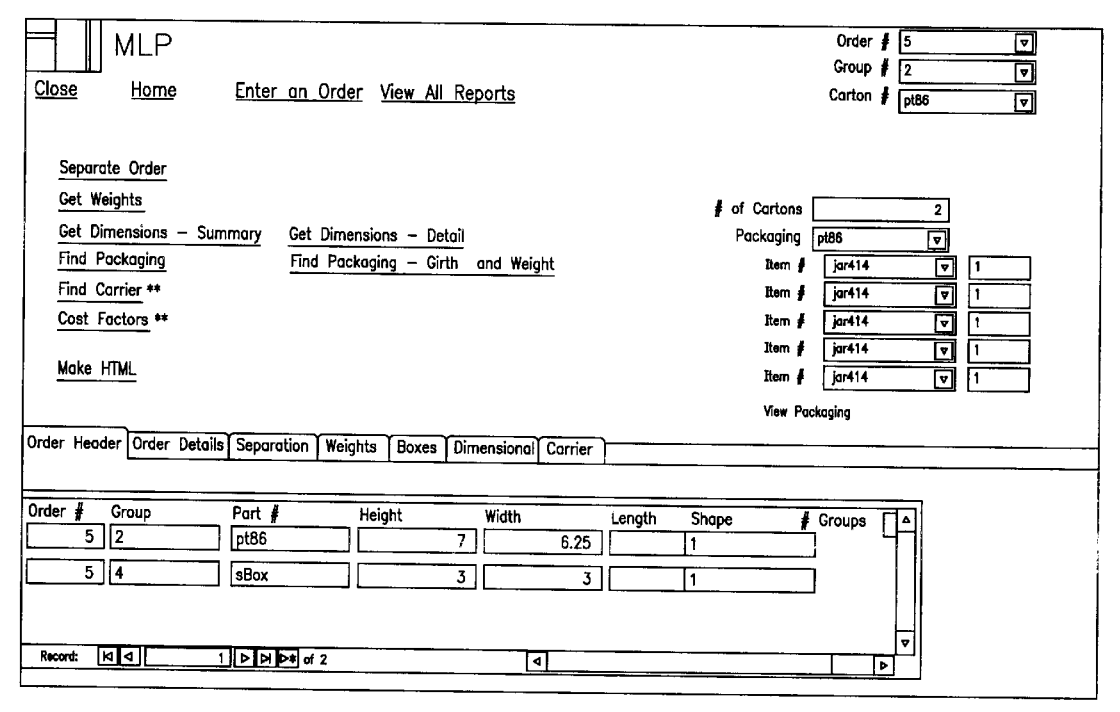
Figure 16:
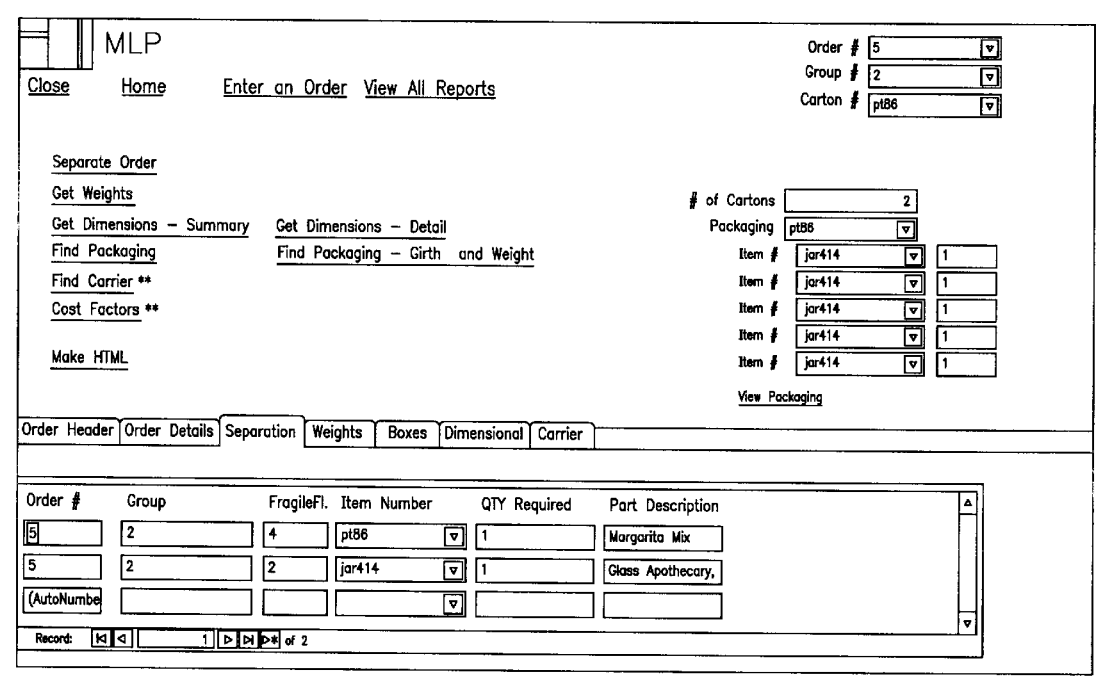
Figure 17:
FIG. 17 shows the display screen with the "Weights" function selected.
Figure 18:
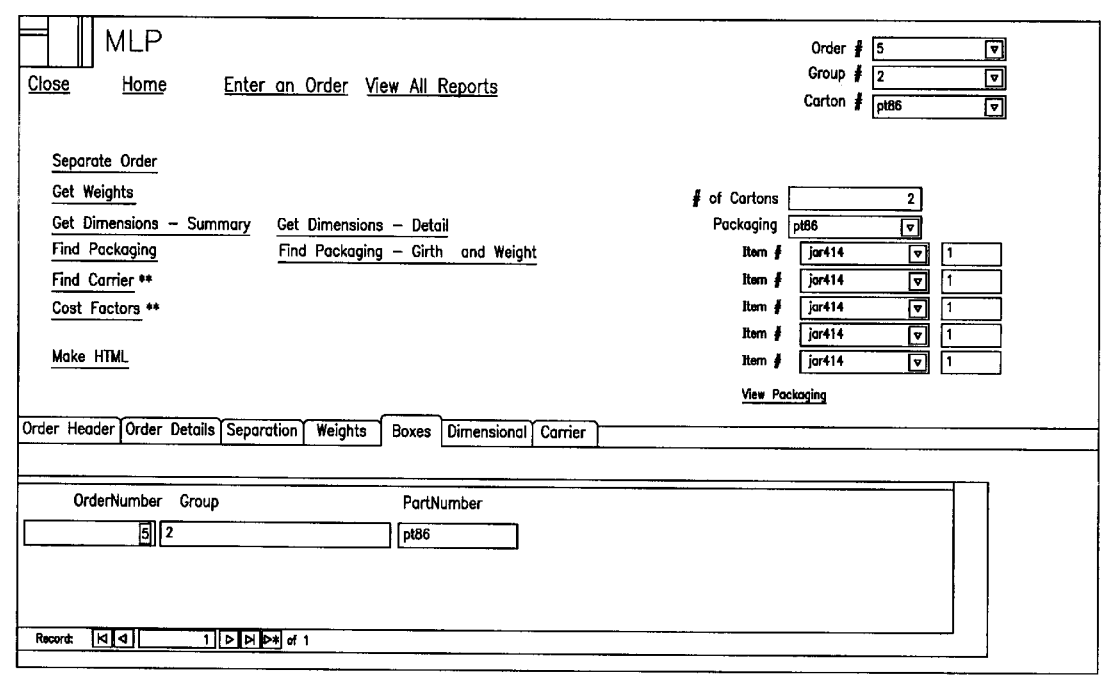

FIG. 13 shows one embodiment of the screen display when "Process Walk Through" is selected. In normal practice, the system will skip this screen display and instead, draw the packaging instructions as soon as the order is entered in the initial screen. FIG. 14 shows another embodiment of the "Process Walk Through" display screen. This screen provides the user with the ability to select "cost factors", make an HTML, or select either a summary of dimensions, detailed dimensions, or girth and width. FIG. 14 shows "Process Walk Through" display screen with the "Order Header" function in the lower window displayed. FIG. 15 shows the display screen with the "Order Details" function selected. FIG. 16 shows the display screen with the "Separation" function selected. FIG. 17 shows the display screen with the "Weights" function selected. FIG. 18 shows the display screen with the "Boxes" function selected. FIG. 19 shows the display screen with the "Carrier" function selected. Because carrier information was not entered into the system, this function does not display any carrier information.

FIG. 20 shows the screen display which is displayed when "Define Part Information" is selected on the packaging home page shown in FIG. 12. This part information screen display allows articles to be defined for demonstration and testing purposes. This screen display also shows the data that is recommended for each article in the user's order entry system, in particular, the article's shape, width, height, length, diameter when applicable, weight when applicable, fragility rating, and it shows the environment in which the article can be packed. The figure shows the information that was entered by the user for an article which is a book. When "Open the Image" is selected, an image representing the article is displayed.

Figure 21:
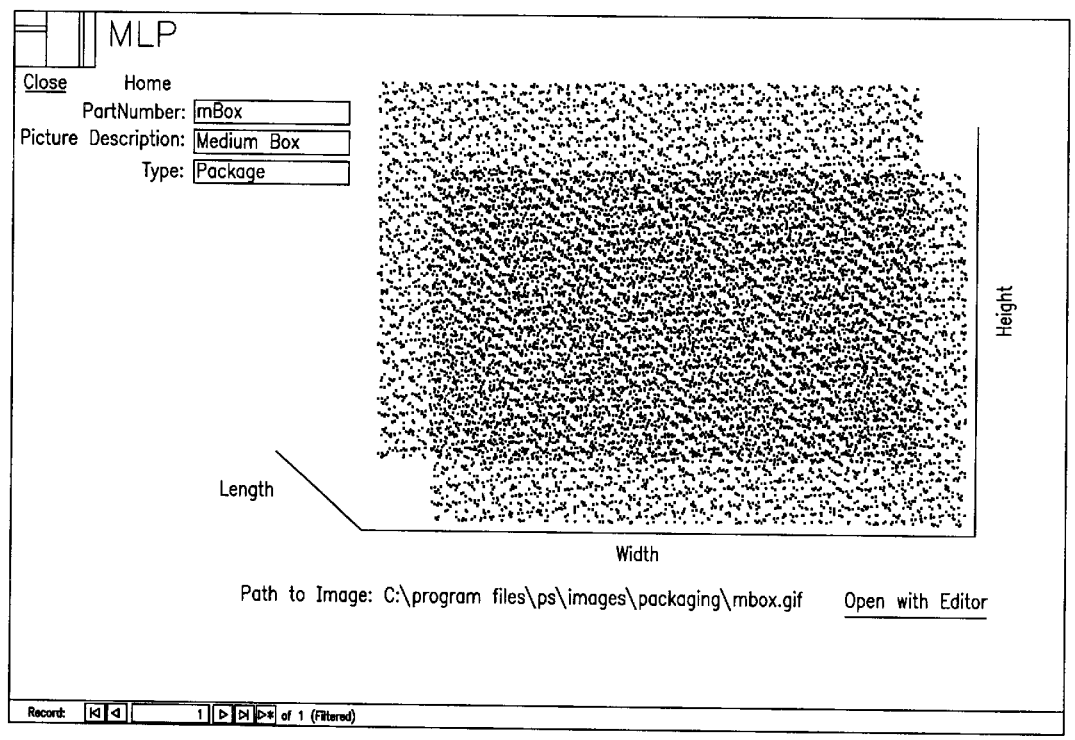
FIG. 21 shows the screen display which is displayed when "Open the Image" is selected on the "Part Information" display screen in FIG. 20.

FIG. 21 shows the screen display which is displayed when "Open the Image" is selected on the "Part Information" display screen in FIG. 20. The screen display shows an image that represents the book entered in the part information display screen. This screen display is used by the user in the administrative function to help identify images of articles and to help draw the images with a drawing function when "Open with Editor" is selected.

Figure 22:
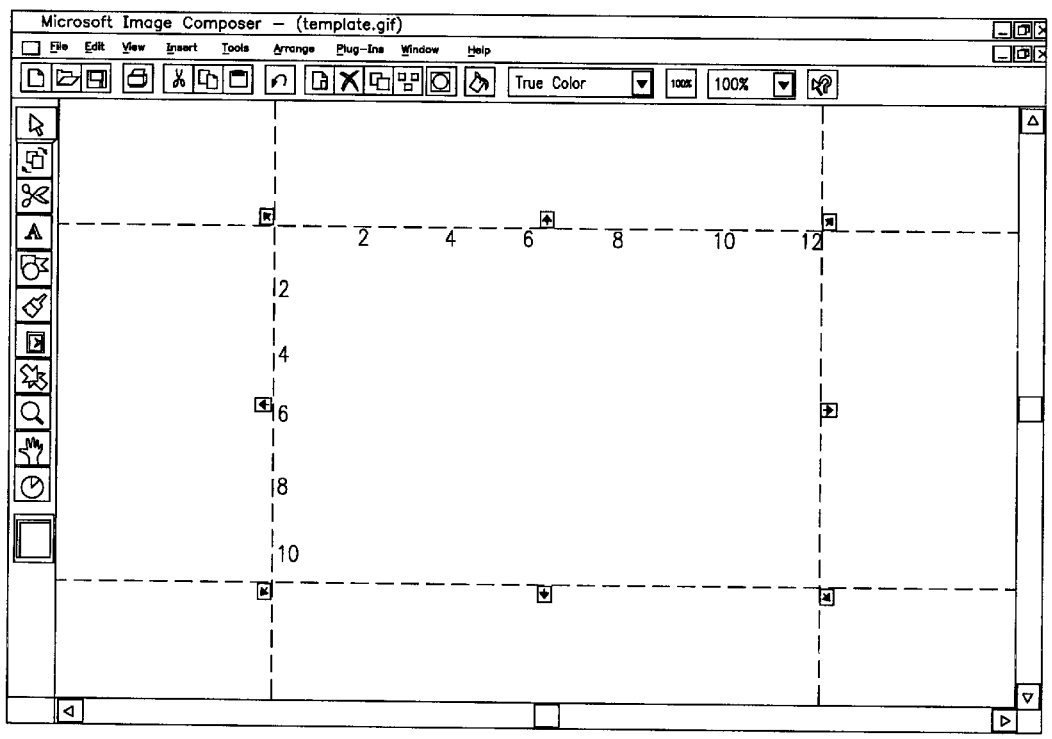
FIG. 22 shows the screen display for the drawing function which is displayed when "Open with Editor" is selected on the "View Packaging Image" screen display in FIG. 21.

FIG. 22 shows the screen display for the drawing function which is displayed when "Open with Editor" is selected on the "View Packaging Image" screen display in FIG. 21. In this figure, Microsoft Image Composer was used to create or edit the images of the articles or containers, however, the system can use any imaging software for the same purpose. As shown in this figure, the system currently requires the images to be gif files with a transparent background, however, the system can be adapted to use other file systems such as tif or bit.

FIG. 23 shows a screen display for entering packaging information related to containers which is displayed when "Enter Packaging Information" is selected on the packaging home page shown in FIG. 12. The information can be supplied from a pre-existing database or entered by the user using this screen display.

FIG. 24 shows a screen display for entering information related to carriers which is displayed when "Enter Carrier Information" is selected on the packaging home page in FIG. 12. The information can be supplied from a pre-existing database or entered by the user using this screen display.

Figure 25:
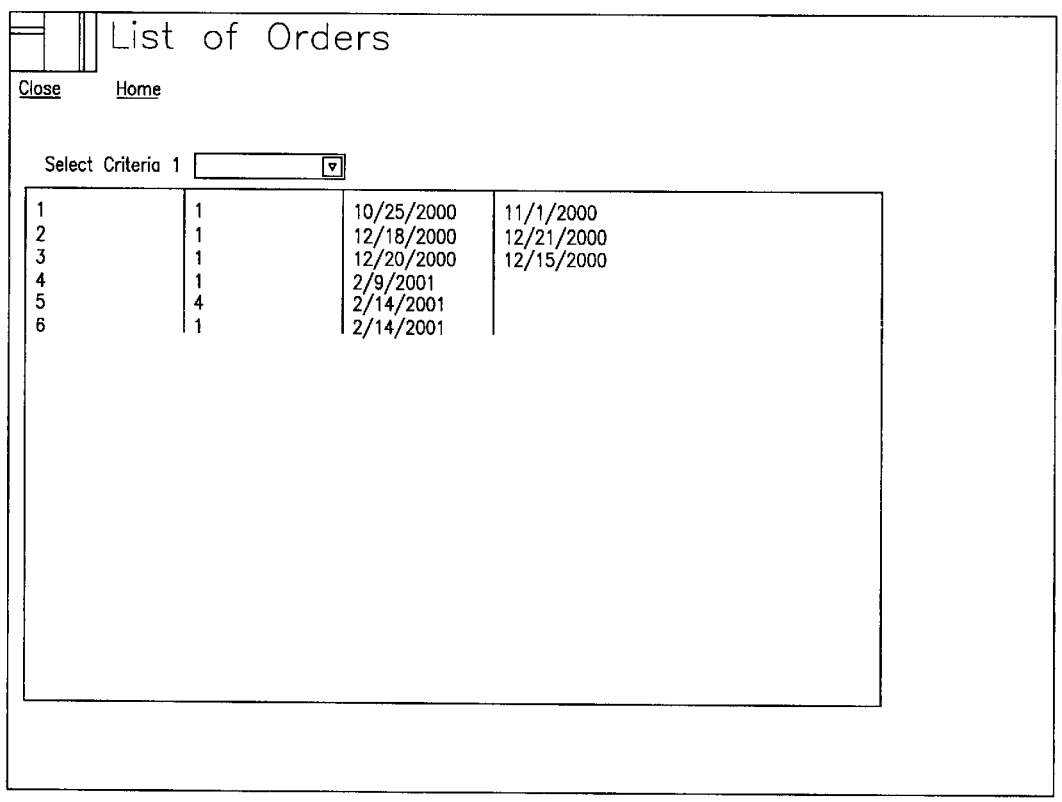
FIG. 25 shows a screen display which is displayed when "View Open Orders" is selected on the packaging home page in FIG. 12.

FIG. 25 shows a screen display which is displayed when "View Open Orders" is selected on the packaging home page in FIG. 12. The list shows the open orders in the system. It shows the number of orders, the amount of each order, the due dates for each order.

Figure 26:
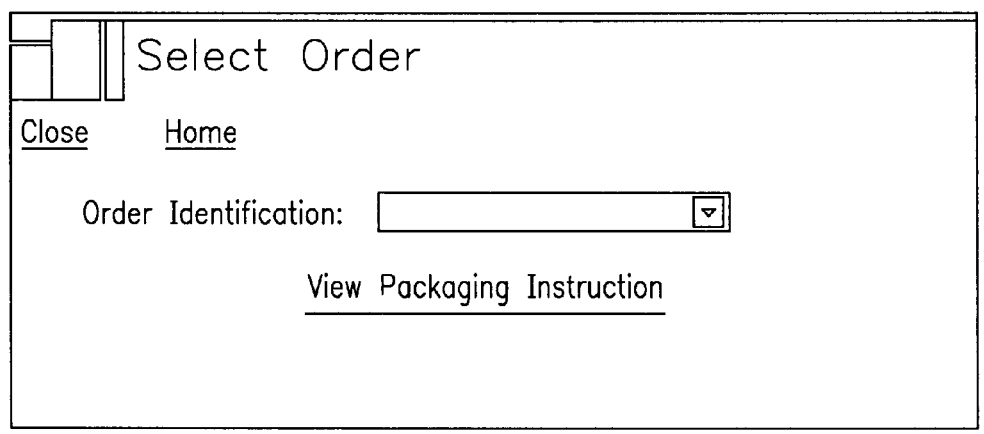
FIG. 26 shows a display screen which is displayed when "Select an Order" is selected on the packaging home page in FIG. 12.

FIG. 26 shows a display screen which is displayed when "Select an Order" is selected on the packaging home page in FIG. 12. In this display, the user enters an order's identification and then selects "View Packaging Instruction" to view the packaging instructions.

FIG. 27 shows a display screen which is displayed when "Enter an Order" is selected on the packaging home page in FIG. 12. The user enters the order information.

Figure 28:
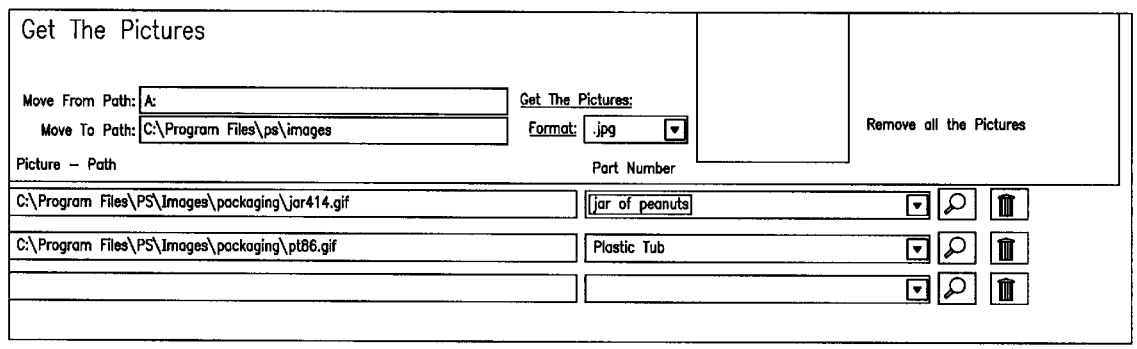
FIG. 28 shows a display screen which is displayed when "Get Images" is selected on the packaging home page in FIG. 12.

FIG. 28 shows a display screen which is displayed when "Get Images" is selected on the packaging home page in FIG. 12. The display allows the user to select, view, or delete particular image files.

Figure 29:
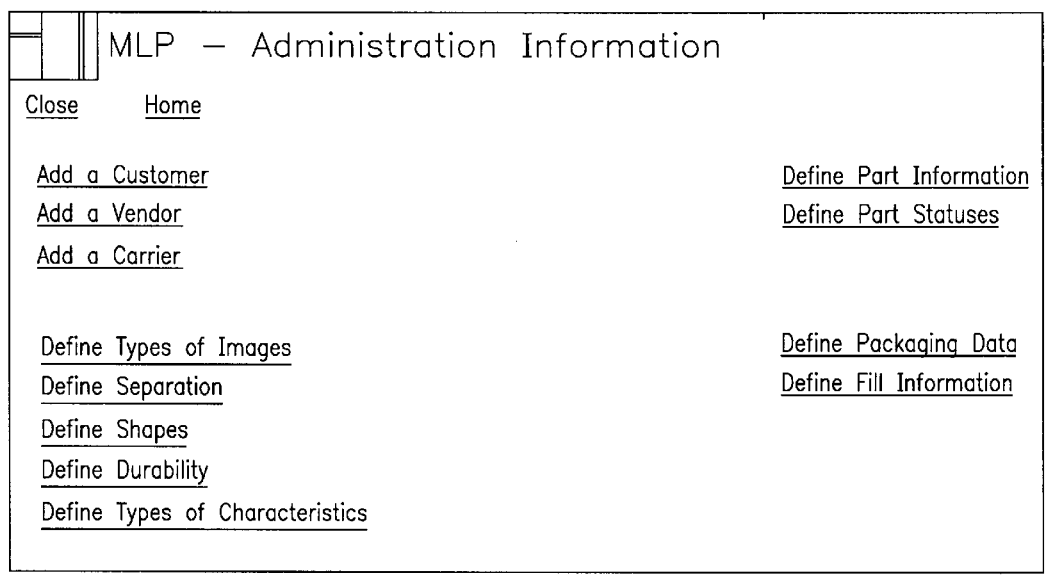
FIG. 29 shows a screen display which is displayed when "Administrative" is selected on the packaging home page in FIG. 12.
Figure 32:
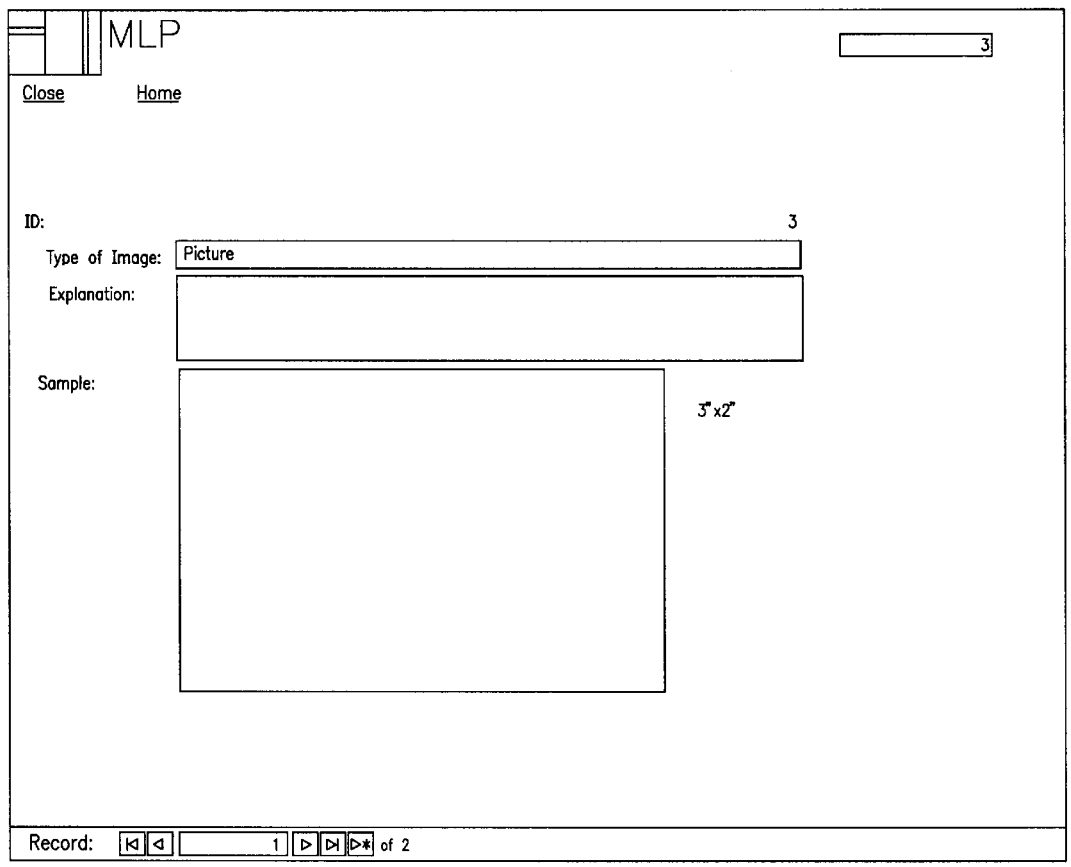
FIG. 32 shows the display screen for entering image information for an article when "Define Types of Images" is selected.
Figure 36:
FIG. 36 shows the display screen for entering characteristics for an article such as height, length, and weight when "Define Types of Characteristics" is selected.
Figure 37:
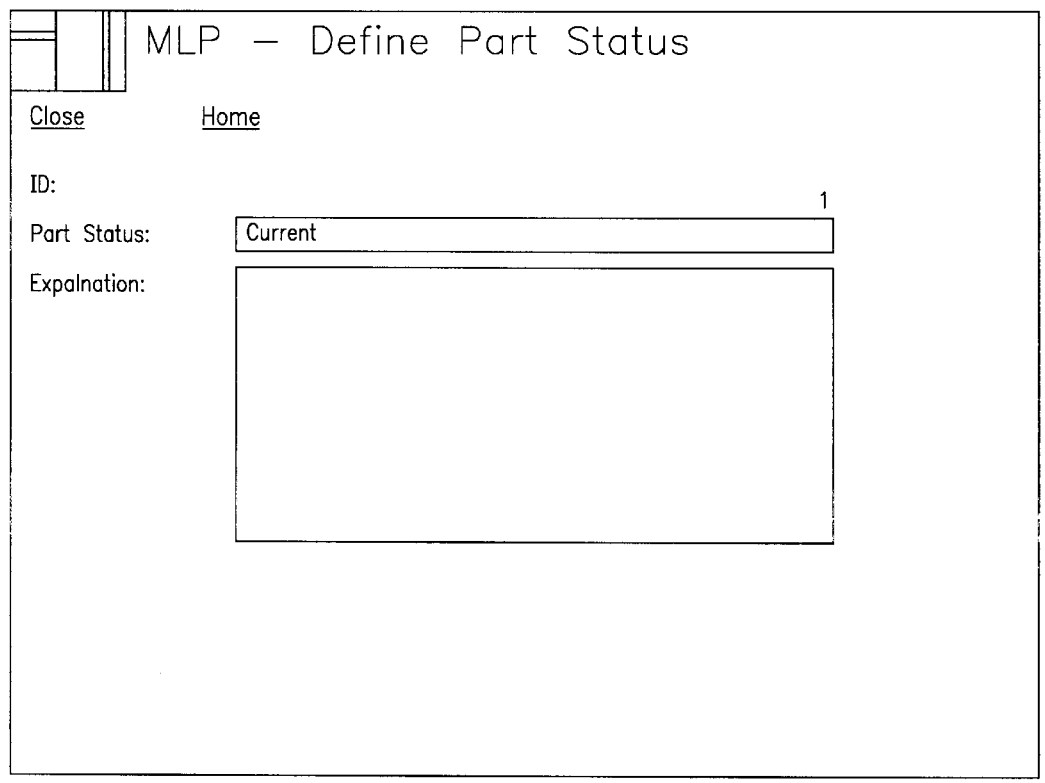
FIG. 37 shows the display screen for entering information related to the status for an article such as in stock, on order, discontinued when "Define Part Status" is selected.
Figure 38:
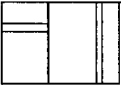
FIG. 38 shows the display screen for entering packaging fill information when "Define Fill Information" is selected.

FIG. 29 shows a screen display which is displayed when "Administrative" is selected on the packaging home page in FIG. 12. This screen display allows the user to add or edit information in the system related to customers, vendors, carriers, articles (parts), packaging, and packaging fill. FIG. 30 shows the display screen for entering customer information when "Add a Customer" is selected. FIG. 31 shows the display screen for entering vendor information when "Add a Vendor" is selected. FIG. 32 shows the display screen for entering image information for an article when "Define Types of Images" is selected. FIG. 33 shows the display screen for entering separation information for an article (whether particular articles cannot be packed in the same container) when "Define Separation" is selected. FIG. 34 shows the display screen for entering shape definitions for an article when "Define Shapes" is selected. FIG. 35 shows the display screen for entering durability information for an article when "Define Durability" is selected. FIG. 36 shows the display screen for entering characteristics for an article such as height, length, and weight when "Define Types of Characteristics" is selected. FIG. 37 shows the display screen for entering information related to the status for an article such as in stock, on order, discontinued when "Define Part Status" is selected. FIG. 38 shows the display screen for entering packaging fill information when "Define Fill Information" is selected. FIG. 39 shows the display screen for entering packaging information when "Define Packaging Data" is selected.

When "View Reports" is selected on the packaging home page in FIG. 12 various reports are available to the user. FIG. 40 shows a display screen entitled "Get Weights Report" which shows the total weight of each article in each customer order. FIG. 41 shows a screen display of the "Separate Order" and "Get Weights" reports for a particular customer order. In the figure, customer order 5 has been separated into two containers for shipping ("Separate Order" report) and the weights for each article in the order is shown in the "Get Weight" report. FIG. 42 shows a screen display of the "Detailed Dimensions" report which shows in detail the dimensions of each article in order 5. FIG. 43 is a screen display which shows the "Summary Dimensions" report for customer order 5. FIG. 44 is a screen display which shows the "Get Boxes" report for customer order 5. FIG. 45 is a screen display which shows the "Get Boxes—Girth, Dimensions, and Weight" report for customer order 5.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

We claim:

1. A computer implemented method for preferably placing one or more articles from a customer order into a container preferably suited for receiving the articles so that the container is ready for shipping, comprising:
   (a) inputting indicia for a plurality of articles into a memory of a programmed computer to produce an article database;
   (b) inputting indicia for a plurality of containers for receiving the articles into the memory of the programmed computer to produce a container database;
   (c) selecting the indicia corresponding to the articles in the customer order from the article database;
   (d) selecting the indicia corresponding to one or more selected containers in the container database;
   (e) generating a plurality of possible packing configurations based on the indicia of the articles in the customer's order and the indicia for one or more of the selected containers wherein the possible packing configurations are generated using a programming language which ranks the articles in a delivery index based upon regulation requirements, size of package, weight of package, fragility of articles, packing material and delivery rates or schedules;
   (f) selecting from the plurality of possible packing configurations a preferred packing configuration including a preferred arrangement of the articles in a particular container based upon the delivery index;
   (g) generating instructions for packing the one of the selected containers using the preferred packing configuration; and, (h) packing the articles from the customer order in the one of the selected containers according to the instructions at the delivery rates or delivery schedules in the preferred packing configuration.

2. The method of claim 1, wherein the indicia for the articles are selected from a group consisting of length, width, height, weight, fragility, composition, flexibility, health factors, safety factors, packing material to protect the article, and combination thereof.

3. The method of claim 2, wherein the plurality of possible packing configurations takes into consideration compatibility of the articles in the customer order.

4. The method of claim 1, wherein the indicia for the plurality of containers are selected from the group consisting of length, width, height, weight, material, and combination thereof.

5. The method of claim 1, wherein a second preferred packing configuration is selected.

6. The method of claim 1, wherein the instructions provide a visual representation of the preferred packing configuration and written instructions for the preferred packing configuration.

7. The method of claim 6, wherein the visual representation and written instructions are displayed on a computer terminal.

8. The method of claim 6 or 7, wherein packing the articles in the particular container is manual.

9. The method of claim 1, wherein the article and container databases use a structured query language.

10. The method of claim 1, wherein the possible packing configurations are generated using a programming language that is independent of an operating system of the programmed computer.

11. The method of claim 10, wherein the preferred packing configuration is provided in extensible markup language to enable data representing the preferred packing configuration to be portable across different types of applications and operating systems, and in extensible stylesheet language to enable the preferred packing configuration to be presented in different formats.

12. The method of claim 1, wherein the preferred packing configuration for the particular container is stored in a packing history database that is then accessed when a subsequent preferred packing configuration is being generated.

13. A computer implemented method for determining the preferred packing of one or more articles from a customer order into a container suited for receiving the articles so that the container is ready for shipping, comprising:
   (a) inputting into a programmed computer an identifier for each article in the customer order;
   (b) retrieving data including indicia for each article corresponding to the identifier from an article database containing indicia for a plurality of articles stored in memory of the programmed computer;
   (c) retrieving data including indicia for one or more containers from a container database stored in the memory of the programmed computer;
   (d) generating a plurality of possible packing configurations based on the indicia for the articles and the indicia for the one or more containers wherein the possible packing configurations are generated using a programming language which ranks the articles in a delivery index based upon regulation requirements, size of package, weight of package, fragility of articles, packing material and delivery rates or schedules;
   (e) selecting a preferred packing configuration from the plurality of possible packing configurations having a preferred arrangement of the articles of the customer order in a particular container based upon the delivery index;
   (f) generating instructions for packing the particular container in the preferred packing configuration; and, (g) packing the particular container with the one or more articles from the customer order according to the instructions at the delivery rates or delivery schedules in the preferred packing configuration.

14. The method of claim 13, further including retrieving labor costs associated with each of the plurality of possible packing configurations stored in a database in the memory of the programmed computer and generating the plurality of possible packing configurations that is further based on the labor costs.

15. The method of claim 13, wherein the indicia for the plurality of articles are selected from the group consisting of length, width, height, weight, fragility, composition, flexibility, health factors, safety factors, packing material to protect the article, and combination thereof.

16. The method of claim 15, wherein the plurality of packing configurations further considers compatibility of the articles in the customer order.

17. The method of claim 13, wherein the indicia for the container are selected from the group consisting of length, width, height, weight, material, and combination thereof.

18. The method of claim 13, wherein a second preferred packing configuration is selected.

19. The method of claim 13, wherein the instructions provide a visual representation of the preferred packing configuration and written instructions for the preferred packing configuration.

20. The method of claim 19, wherein the visual representation and written instructions are displayed on a computer terminal.

21. The method of claim 19 or 20, wherein the packing is manual.

22. The method of claim 13, wherein an identifier for the customer order is entered into an order entry system.

23. The method of claim 22, wherein the order entry system is a Legacy system.

24. The method of claim 13, wherein the databases use a structured query language to retrieve and manipulate the data consisting of the indicia.

25. The method of claim 13, wherein the article and container indicia are manipulated to produce the possible packing configurations using a programming language that is independent of an operating system of the programmed computer.

26. The method of claim 25, wherein the preferred packing configuration is provided in extensible markup language to enable data representing the preferred packing configuration to be portable across applications and operating systems of different types, and in extensible stylesheet language to enable the preferred packing configuration to be presented in different formats.

27. The method of claim 18, wherein the preferred packing configuration in the particular container is stored in a packing history database that is then accessed when a subsequent preferred packing configuration is being generated.

28. A method for packing articles from a customer order into a container suited for receiving the articles, comprising:

(a) inputting customer order data into an order entry system in a programmed computer;

(b) converting the customer order data in the order entry system to a language that enables the data to be portable across computer applications and computer operating systems;

(c) retrieving from an article database indicia for the articles ordered and from a container database indicia for one or more containers wherein the article and container indicia are in a language that enables the indicia to be portable across computer applications and computer operating systems;

(d) generating using the programmed computer a plurality of possible packing configurations based on the indicia for the articles from the customer order and the indicia for the one or more containers using a program code that is independent of an operating system of the programmed computer wherein the possible packing configurations are generated using a programming language which ranks the articles in a delivery index based upon regulation requirements, size of package, weight of package, fragility of articles, packing material and determining rates or schedules;

(e) selecting a preferred packing configuration from the plurality of possible packing configurations based upon the delivery index;

(f) generating using the programmed computer instructions for the preferred packing configuration including a preferred arrangement of the articles from the customer order in a particular container; and (g) packing the articles from the customer order in the preferred arrangement in the particular container according to the instructions at the delivery rates or delivery schedules in the preferred packing configuration.

29. The method of claim 28, further including retrieving from a labor cost database, indicia consisting of labor costs associated with each of the plurality of possible packing configurations.

30. The method of claim 28, wherein the indicia for the articles from the customer order are selected from data from the group consisting of length, width, height, weight, fragility, composition, flexibility, health factors, safety factors, packing material to protect the article, and combination thereof.

31. The method of claim 30, wherein the plurality of packing configurations is further based on compatibility of the articles from the customer order.

32. The method of claim 28, wherein the indicia for the containers are selected from data from the group consisting of length, width, height, weight, material, and combination thereof.

33. The method of claim 28, wherein a second preferred packing configuration is selected.

34. The method of claim 28, wherein the packing instructions provide a visual representation of the preferred packing configuration and written instructions for the preferred packing configuration.

35. The method of claim 34, wherein the visual representation and written instructions are displayed on a computer screen.

36. The method of claim 34 or 35, wherein the packing is conducted manually.

37. The method of claim 28, wherein the preferred packing configuration is stored in a packing history database that is then accessed when a subsequent preferred packing configuration is being generated.

38. A system for placing one or more articles from a customer order into a container suited for receiving the articles so that the container is ready for shipping, comprising:

(a) means for inputting indicia for a plurality of articles into a memory of a programmed computer to produce an article database;

(b) means for inputting indicia for a plurality of containers for receiving the articles into the memory of the programmed computer to produce a container database;

(c) means for selecting the indicia corresponding to the articles in the customer order from the article database;

(d) means for selecting the indicia corresponding to one or more of the containers in the container database;

(e) means for generating a plurality of possible packing configurations based on the indicia for each of the articles from the customer order and the indicia for one or more of the containers wherein the possible packing configurations are generated using a programming language which ranks the articles in a delivery index based upon regulation requirements, size of package, weight of package, fragility of articles, packing material and delivery rates or schedules;

(f) means for selecting from the plurality of possible packing configurations a preferred packing configuration consisting of a preferred arrangement of the articles from the customer order in a particular container based upon the delivery index; and (g) means for generating instructions for packing the particular container with the articles from the customer order in the preferred arrangement using the preferred packing configuration wherein the system enables packing the articles in the particular container according to the instructions at the delivery rates or delivery schedules in the preferred packing configuration.

39. The system of claim 38, wherein the indicia for the plurality of articles are selected from the group consisting of length, width, height, weight, fragility, composition, flexibility, health factors, safety factors, packing material to protect the article, and combination thereof.

40. The system of claim 38, further including a means for inputting compatibility data of the articles from the customer order and wherein the means for generating the plurality of packing configurations is further based on compatibility data of the articles.

41. The system of claim 38, wherein the indicia for the plurality of containers are data selected from the group consisting of length, width, height, weight, material, and combination thereof.

42. The system of claim 38, wherein the means for selecting the preferred packing configuration is able to select a second preferred packing configuration.

43. The system of claim 38, wherein the instructions provide a visual representation of the preferred packing configuration and written instructions for the preferred packing configuration.

44. The system of claim 43, wherein the visual representation and written instructions are displayed on a computer screen.

45. The system of claim 43 or 44, further comprising a means for packing the articles in the particular container manually.

46. The system of claim 38, wherein the article database and the container database use a structured query language.

47. The system of claim 38, wherein means for generating the plurality of possible packing configurations uses a programming language that is independent of an operating system of the programmed computer.

48. The system of claim 47, wherein the preferred packing configuration is provided in extensible markup language to enable data representing the preferred packing configuration to be portable across applications and operating systems of different types, and in extensible stylesheet language to enable the preferred packing configuration to be presented in different formats.

49. The system of claim 38, further including a means for storing the preferred packing configuration in a packing history database that is then accessed when a subsequent preferred packing configuration is being generated.

50. A computer implemented system for determining a preferred packing arrangement of articles from a customer order into a container preferably suited for receiving the articles so that the container is ready for shipping, comprising:

(a) means for inputting an identifier for each article of the customer order into a memory of a programmed computer;

(b) means for storing and retrieving indicia for a plurality of articles in the memory of the programmed computer;

(c) means for storing and retrieving indicia for one or more containers stored in the memory of the programmed computer;

(d) means for generating a plurality of possible packing configurations based on the indicia for each article of the customer order and the indicia for one or more of the containers wherein the possible packing configurations are generated using a Programming language which ranks the articles in a delivery index based upon regulation requirements, size of package, weight of package, fragility of articles, packing material and delivery rates or schedules;

(e) means for selecting a preferred packing configuration from the plurality of possible packing configurations having a preferred arrangement of the articles of the customer order in a particular container based upon the delivery index; and (f) means for generating instructions for packing the particular container wherein the system enables packing of the particular container with the articles of the customer order in the preferred arrangement using the preferred packing configuration at the delivery rates or delivery schedules in the packing configuration.

51. The system of claim 50, further including means for storing and retrieving labor costs associated with each of the plurality of possible packing configurations and means for generating the plurality of possible packing configurations further based on the labor costs.

52. The system of claim 50, wherein the indicia for the articles are selected from data from the group consisting of length, width, height, weight, fragility, composition, flexibility, health factors, safety factors, packing material to protect the article, and combination thereof.

53. The system of claim 52, wherein the means for generating a plurality of packing configurations considers compatibility of the articles in the customer order.

54. The system of claim 50, wherein the indicia for the container are selected from data from the group consisting of length, width, height, weight, material, and combination thereof.

55. The system of claim 50, wherein the means for selecting a preferred packing configuration selects a second preferred packing configuration.

56. The system of claim 50, further including a means for displaying a visual representation of the preferred packing configuration and written instructions for the preferred packing configuration in the particular container.

57. The system of claim 56, wherein the means for displaying the visual representation and written instructions is a computer screen.

58. The system of claim 50, further including an order entry system and a means for inputting an identifier for the customer order entered into an order entry system.

59. The system of claim 58, wherein the order entry system is a Legacy system.

60. The system of claim 50, wherein the means for storing and retrieving the indicia uses a structured query language.

61. The system of claim 50, wherein the means for generating the plurality of possible packing configurations uses a programming language that is independent of an operating system of the programmed computer.

62. The system of claim 61, wherein the preferred packing configuration is provided in extensible markup language to enable data representing the preferred configuration to be portable across applications and operating systems of different types, and in extensible stylesheet language to enable the preferred configuration to be presented in different formats.

63. The system of claim 50, further including a means for storing the preferred packing configuration in a packing history database that is then accessed when a subsequent preferred packing configuration is being generated.

64. A system for packing articles from a customer order into a container suited for receiving the articles so that the container is ready for shipping, comprising:

(a) means for inputting customer order data into an order entry system in a programmed computer;

(b) means for converting the customer order data in the order entry system to a language that enables the data to be portable across computer applications and computer operating systems;

(c) means for retrieving from a database indicia for the articles from the customer order and indicia for one or more containers wherein the indicia are in a language that enables the indicia to be portable across computer applications and computer operating systems;

(d) means for generating in the programmed computer a plurality of possible packing configurations based on the indicia using a program code that is independent of an operating system of the programmed computer wherein the possible packing configurations are generated using a programming language which ranks the articles in a delivery index based upon regulation requirements, size of package, weight of package, fragility of articles, packing material and delivery rates or schedules;

(e) means for selecting a preferred packing configuration from the plurality of possible packing configurations based upon the delivery index; and (f) means for generating instructions for the preferred packing configuration including a preferred arrangement of the articles from the customer order in a particular container wherein the system enables packing the particular container according to the instructions at the delivery rates or delivery schedules in the preferred packing configuration.

65. The system of claim 64, further including a means for retrieving from the database indicia consisting of labor costs associated with each of the plurality of possible packing configurations.

66. The system of claim 64, wherein the indicia for the articles are selected from data from the group consisting of length, width, height, weight, fragility, composition, flexibility, health factors, safety factors, packing material to protect the article, and combination thereof.

67. The system of claim 66, wherein the means for generating the plurality of packing configurations considers compatibility of the articles in the customer order.

68. The system of claim 64, wherein the indicia for the container are selected from data from the group consisting of length, width, height, weight, material, and combination thereof.

69. The system of claim 68, wherein the means for selecting the preferred packing configuration is capable of selecting a second preferred packing configuration is selected.

70. The system of claim 64, wherein the instructions provide a visual representation of the preferred packing configuration and written instructions for the preferred packing configuration.

71. The system of claim 70, wherein the visual representation and written instructions are displayed on a computer screen.

72. The system of claim 70, or 71, further including a means for packing the particular container manually.

73. The system of claim 64, further including a means for storing the preferred packing configuration in a packing history database that is then accessed when a subsequent preferred packing configuration is being generated.

* * * * *

UNITED STATES PATENT AND TRADEMARK OFFICE
CERTIFICATE OF CORRECTION

PATENT NO. : 6,721,762 B1
DATED : April 13, 2004
INVENTOR(S) : Michael C. Levine and Jerry D. Norris It is certified that error appears in the above-identified patent and that said Letters Patent is hereby corrected as shown below:

Column 2,
Line 56, "Table: tblOrderDetailStretch" should be -- Table: tlbOrderBoxesImages --.

Column 12,
Line 2, "heath factors" should be -- health factors --.

Column 22,
Line 2, "Form: frnparts" should be -- Form: frnParts --
Line 34, "From" should be -- Form --.

Column 32,
Lines 28 and 29, "configuration is selected" should be -- configuration. --.

Signed and Sealed this

Twentieth Day of July, 2004

JON W. DUDAS
*Acting Director of the United States Patent and Trademark Office*